(12) United States Patent
Li et al.

(10) Patent No.: US 8,199,766 B2
(45) Date of Patent: Jun. 12, 2012

(54) METHODS FOR SENDING SMALL PACKETS IN A PEER-TO-PEER (P2P) NETWORK

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 974 days.

(21) Appl. No.: 12/168,673

(22) Filed: Jul. 7, 2008

(65) Prior Publication Data

US 2009/0016272 A1 Jan. 15, 2009

Related U.S. Application Data

(60) Provisional application No. 60/948,654, filed on Jul. 9, 2007.

(51) Int. Cl.
*H04L 12/28* (2006.01)
(52) U.S. Cl. ....................................................... 370/431
(58) Field of Classification Search .................. None
See application file for complete search history.

(56) References Cited

U.S. PATENT DOCUMENTS

| | | | |
|---|---|---|---|
| 6,072,784 A * | 6/2000 | Agrawal et al. ............ | 370/311 |
| 6,272,193 B1 | 8/2001 | Eglit | |
| 6,317,413 B1 | 11/2001 | Honkasalo | |
| 6,370,392 B1 * | 4/2002 | Li et al. ..................... | 455/522 |
| 6,640,087 B2 | 10/2003 | Reed et al. | |
| 6,681,115 B1 | 1/2004 | McKenna et al. | |
| 6,690,944 B1 | 2/2004 | Lee et al. | |
| 7,107,013 B2 | 9/2006 | Qiu | |
| 7,203,461 B2 | 4/2007 | Chang et al. | |
| 7,206,564 B2 | 4/2007 | Yang et al. | |
| 7,263,077 B1 * | 8/2007 | Hamalainen et al. ......... | 370/311 |
| 7,324,429 B2 | 1/2008 | Walton et al. | |
| 7,333,814 B2 | 2/2008 | Roberts | |
| 7,352,720 B2 | 4/2008 | Chang et al. | |
| 7,369,549 B2 | 5/2008 | Wu et al. | |

(Continued)

FOREIGN PATENT DOCUMENTS

EP 1119153 7/2001

(Continued)

OTHER PUBLICATIONS

International Search Authroity—PCT/US08/069450, International Search Authority—European Patent Office—Jan. 22, 2009.

(Continued)

*Primary Examiner* — Chi Pham
*Assistant Examiner* — Fan Ng
(74) *Attorney, Agent, or Firm* — Peng Zhu; James K. O'Hare

(57) ABSTRACT

An improved mechanism is provided that facilitates transmission of small packets within an ad hoc peer-to-peer network. A small packet is identified to a receiver within a control channel so that its lower power can be considered in an interference management protocol implemented among local peer devices. In a traffic slot, a transmitter voluntarily backs down on the transmitter power as a smaller packet will require much lower signal-to-noise ratio. This will improve the signal energy per bit per noise power density for the transmission as well as minimize the interference caused to other wireless communications happening in the same spectrum.

33 Claims, 20 Drawing Sheets

U.S. PATENT DOCUMENTS

| | | | |
|---|---|---|---|
| 7,386,306 B2* | 6/2008 | Laroia et al. | 455/422.1 |
| 7,440,728 B2 | 10/2008 | Abhishek et al. | |
| 7,480,489 B2 | 1/2009 | Eslick et al. | |
| 7,627,298 B2 | 12/2009 | Taira et al. | |
| 7,715,354 B2* | 5/2010 | Arunan et al. | 370/338 |
| 7,720,029 B2* | 5/2010 | Orava et al. | 370/329 |
| 7,756,483 B2 | 7/2010 | Chang et al. | |
| 7,769,406 B2* | 8/2010 | Lin et al. | 455/522 |
| 7,848,706 B2* | 12/2010 | Vilzmann et al. | 455/63.1 |
| 7,907,907 B2 | 3/2011 | Qiu | |
| 2002/0119796 A1* | 8/2002 | Vanghi | 455/522 |
| 2004/0229625 A1 | 11/2004 | Laroia et al. | |
| 2005/0135318 A1 | 6/2005 | Walton et al. | |
| 2005/0201280 A1 | 9/2005 | Lunby et al. | |
| 2006/0067416 A1 | 3/2006 | Tirkkonen et al. | |
| 2006/0126545 A1 | 6/2006 | Nanda | |
| 2007/0060187 A1* | 3/2007 | Englund et al. | 455/522 |
| 2007/0093209 A1 | 4/2007 | Agrawal et al. | |
| 2007/0105574 A1 | 5/2007 | Gupta et al. | |
| 2007/0140168 A1* | 6/2007 | Laroia et al. | 370/330 |
| 2007/0147235 A1 | 6/2007 | Kim | |
| 2007/0184806 A1 | 8/2007 | Yang et al. | |
| 2007/0195736 A1 | 8/2007 | Taira et al. | |
| 2007/0230404 A1* | 10/2007 | Song | 370/335 |
| 2007/0253355 A1 | 11/2007 | Hande et al. | |
| 2008/0130533 A1* | 6/2008 | Dottling et al. | 370/310 |
| 2008/0254760 A1* | 10/2008 | Wu et al. | 455/343.1 |
| 2009/0013081 A1 | 1/2009 | Laroia et al. | |
| 2009/0016271 A1 | 1/2009 | Li et al. | |
| 2009/0016287 A1 | 1/2009 | Li et al. | |
| 2009/0016288 A1 | 1/2009 | Li et al. | |
| 2009/0016289 A1 | 1/2009 | Li et al. | |
| 2009/0019165 A1 | 1/2009 | Li et al. | |
| 2010/0260154 A1 | 10/2010 | Frank et al. | |

FOREIGN PATENT DOCUMENTS

| | | |
|---|---|---|
| WO | 9711535 | 3/1997 |
| WO | 2006124042 | 11/2006 |
| WO | 2007059448 | 5/2007 |

OTHER PUBLICATIONS

International Search Report—PCT/US08/069447, International Search Authority—European Patent Office—Jan. 22, 2009.
International Search Report—PCT/US08/069449, International Search Authroity—European Patent Office—Jan. 22, 2009.
International Search Report—PCT/US08/069451, International Search Authority—European Patent Office—Jan. 22, 2009.
International Search Report—PCT/US08/069452, International Search Authority—European Patent Office—Jan. 22, 2009.
Written Opinion—PCT/US08/069447, International Search Authority—European Patent Office—Jan. 22, 2009.
Written Opinion—PCT/US08/069449, International Search Authroity—European Patent Office—Jan. 22, 2009.
Written Opinion—PCT/US08/069450, International Search Authority—European Patent Office—Jan. 22, 2009.
Written Opinion—PCT/US08/069451, International Search Authority—European Patent Office—Jan. 22, 2009.
Written Opinion—PCT/US08/069452, International Search Authroity—European Patent Office—Jan. 22, 2009.
International Search Report—PCT/US08/069448, International Search Authority—European Patent Office—Jan. 22, 2009.
Written Opinion—PCT/US08/069448, International Search Authority—European Patent Office—Jan. 22, 2009.
Bernard Sklar "Digital communication fundamentals and applications",2000,prentice hall,2nd,462-463.

* cited by examiner

METHODS FOR SENDING SMALL PACKETS IN A PEER-TO-PEER (P2P) NETWORK

CLAIM OF PRIORITY UNDER 35 U.S.C. §119

The present application for patent claims priority to U.S. Provisional Application No. 60/948,654 entitled "Method and Apparatuses Relating to Peer to Peer Communications" filed Jul. 9, 2007, and assigned to the assignee hereof and hereby expressly incorporated by reference herein.

BACKGROUND

1. Field

The present invention relates to wireless communication within a peer-to-peer network and, in particular, to methods by which a mobile terminal may send small amounts of data to an intended receiver terminal.

2. Background

In a wireless network, e.g., an ad hoc network, in which a network infrastructure does not exist, a terminal has to combat certain challenges in order to set up a communication link with another peer terminal. One challenge is that when a terminal just powers up or moves into a new area, the terminal may have to first find out whether another terminal is present in the vicinity before any communication between the two terminals can start.

Due to the lack of the network infrastructure, terminals in an ad hoc wireless network may often not have a common timing reference or network controller which can assist in traffic management. So it is possible that when a first terminal is transmitting a signal and a second terminal is not in the receiving mode, therefore the transmitted signal does not help the second terminal to detect the presence of the first terminal. Power efficiency has great impact on the battery life of the terminals and is thus another important issue in the wireless system.

Additionally, a plurality of wireless terminals may operate in an environment while sharing a frequency spectrum to establish ad hoc peer-to-peer communications. Because such ad hoc peer-to-peer communications are not centrally managed by a centralized controller, interference between multiple peer-to-peer links among nearby wireless terminals is problem. That is, transmissions from a wireless terminal may cause interference with other unintended receiver wireless terminals.

Significantly, power efficiency has a great impact on the battery life of the wireless terminals and thus presents another challenge in wireless systems. Existing peer to peer systems typically employ a simple fixed power arrangement for simplicity. Under such an arrangement, a transmitter uses a fixed traffic transmission power regardless the distance of the intended receiver and the channel condition. A fixed power system, however, suffers from poor power efficiency and reduced overall throughput due to signal interference.

Additionally, a plurality of wireless terminals may operate in an environment while sharing a frequency spectrum to establish ad hoc peer-to-peer communications. Because such ad hoc peer-to-peer communications are not centrally managed by a centralized controller, interference between multiple peer-to-peer links among nearby wireless terminals is problem.

Consequently, a solution is needed to permit peer-to-peer communications a shared frequency spectrum while reducing unwanted interference to other wireless terminals.

SUMMARY

In one example, a first wireless device is provided having a connection with a second wireless device in a peer to peer communication network. The first device may select a first power ratio value from a plurality of predetermined power ratio values. It then sends a first transmission request signal in a first traffic slot. The first device may monitor to receive a request response signal from the second wireless device, the request response signal indicating that the second wireless device is ready to receive a traffic signal from the first wireless device. If the request response signal is received, the first device may send a first traffic signal in the first traffic slot with the transmission power determined as a function of the transmission power of the first transmission request signal and the determined first power ratio value. The ratio of the power of the first traffic signal and the power of the first transmission request signal may be equal to the determined first power ratio value. The first transmission request signal may include information indicative of the determined first power ratio value. The first power ratio value may be selected from two predetermined power ratio values, the difference between the two predetermined power ratio values is at least 10 dB. The first power ratio value is determined as a function of the amount of data to be sent in the first traffic signal.

The first wireless device may further check the amount of data to be sent to the second wireless device. It may select a second power ratio value, as a function of the amount of data to be sent, from the plurality of predetermined power ratio values, the second power ratio value being different from the first power ratio value. The first device may also send a second transmission request signal in a second traffic slot and monitors to receive a request response signal from the second wireless device, the request response signal indicating that the second wireless device is ready to receive a traffic signal from the first wireless device. If the request response signal is received, the first device may send a second traffic signal in the second traffic slot with the transmission power determined as a function of the transmission power of the second transmission request signal and the determined second power ratio value. The amount of data to be sent in the second traffic slot may be at least twice as much as the amount of data sent in the first traffic slot and the second power ratio is at least 10 dB greater than the first power ratio. The transmission power of the second request signal may be the same as the transmission power used in the first request signal. The first request signal may be sent in two tones and the information indicative of the determined first power ratio value is signaled in the phase difference between the two tones. The plurality of predetermined power ratio values may include values in a continuous interval between two predetermined values.

Prior to sending the first traffic signal, the first device may send a first pilot signal in a first part of a pilot channel associated with the first traffic slot, the transmission power of the first pilot signal being a function of the transmission power of the first transmission request signal. It may also send a second pilot signal in a second part of the pilot channel the transmission power of the first pilot signal being a function of the transmission power of the first traffic signal.

The first device may also monitor to receive a rate feedback signal in a rate feed back channel associated with the first traffic slot, and wherein the transmission power of the first traffic signal is determined also as a function of the rate feedback signal.

In another example, a second wireless device is provided in a peer to peer communication network, the second wireless device having a connection with a first wireless device. The second device may receive a transmission request signal from the first wireless device, the first transmission request signal indicating that the first wireless device intends to send a traffic signal to the second wireless device and including information indicative of a power ratio value. It may then recover the power ratio value from the transmission request signal. The second device may measure the power of the received transmission request signal. The power of the traffic signal to be received from the first wireless device may be predicted as a function of the measured power of the received transmission request signal and the recovered power ratio value. The second device can then determine whether to receive the traffic signal from the first wireless device as a function of the predicted power. The second device then sends a request response signal to the first wireless device if it is determined to receive the traffic signal. The predicted power may be equal to the measured power of the received transmission request signal multiplied by the recovered power ratio value. The transmission power of the request response signal may be determined as a function of the measured power of the received transmission request signal and is independent of the recovered power ratio value.

In yet another example, a third wireless device is provided having a connection with a fourth wireless device in a peer-to-peer communication network. The third device may receive a first transmission request signal in a traffic slot from the fourth wireless device, the first transmission request signal indicating that the fourth wireless device intends to send a traffic signal to the third wireless device. A second transmission request signal may also be received in the traffic slot from a first wireless device, the second transmission request signal indicating that the first wireless device intends to send another traffic signal to a wireless device different from the third wireless device, the second transmission request signal including information indicative of a power ratio value. The power ratio value may be recovered from the second transmission request signal. The power of the received first and second transmission request signals may also be measured by the third device. The third device can then predict the power of the desired traffic signal to be received from the fourth wireless device as a function of the measured power of the received first transmission request signal. The third device can also predict the power of the interfering traffic signal to be transmitted by the first wireless device as a function of the measured power of the received second transmission request signal and the recovered power ratio value. It may then determine whether to receive the traffic signal from the fourth wireless device as a function of the predicted powers of the desired and interfering traffic signals. A request response signal is then sent to the fourth wireless device if it is determined to receive the traffic signal from the fourth wireless device. The predicted power of the interfering traffic signal may be equal to the measured power of the received second transmission request signal multiplied by the recovered power ratio value. Determining whether to receive the traffic signal from the fourth wireless device may be determined as a function of ratio between the predicted powers of the desired and interfering traffic signals.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
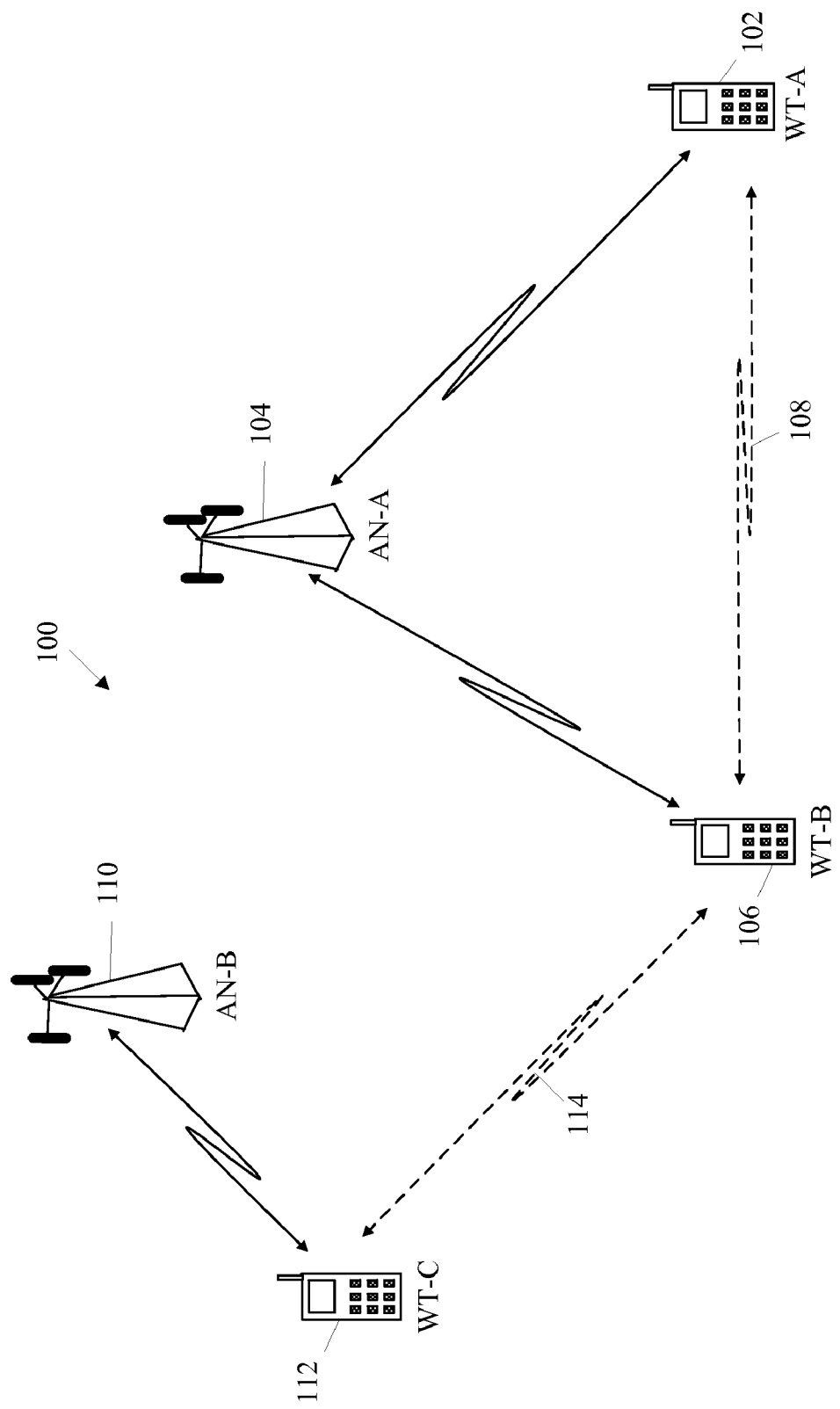
FIG. 1 is a block diagram illustrating the how an ad hoc peer-to-peer network may be implemented, e.g., in conjunction a wide area network.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One feature provides a transmitter wireless terminal configured to establish a peer to peer communication link with a receiver wireless terminal over a shared communication channel. The transmitter wireless terminal may scale its transmit power as a function of a channel gain for the communication channel between the transmitter and receiver wireless terminals. The scaled transmit power may be utilized by the transmitter and receiver wireless terminals to perform link scheduling over the communication channel. For instance, the scaled transmit power may be used by the transmitter wireless terminal to perform a transmitter yielding with other neighboring transmitter wireless terminals utilizing the shared communication channel. Similarly, the scaled transmit power may be used by the receiver wireless terminal to perform receiver yielding with other neighboring receiver wireless terminal utilizing the shared communication channel.

Another feature provides an improved mechanism that facilitates transmission of small packets. In a traffic slot, a transmitter voluntarily backs down on the transmitter power as a smaller packet will require much lower SNR. This will improve the signal energy per bit per noise power density ($E\_b/N\_0$) for the transmission as well as minimize the interference caused to other wireless communications happening in the same spectrum. The fact that a small packet is being transmitted can be signaled in a control channel so that the other peer-to-peer devices can use this information for their scheduling and rate prediction algorithms.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers (terminals), desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established. Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., OFDM symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Baseline Peer-to-Peer Protocol

An interference management protocol is provided that allows a plurality of wireless terminals to operate in an environment while sharing a frequency spectrum to establish ad hoc peer-to-peer communications. Because ad hoc peer-to-peer communications are not centrally managed by a centralized controller, interference between multiple peer-to-peer links among nearby wireless terminals may be a problem. However, the peer-to-peer protocol described herein facilitates establishing and/or maintaining ad hoc peer-to-peer connections among different wireless terminals without the assistance of a centralized controller.

Figure 2:
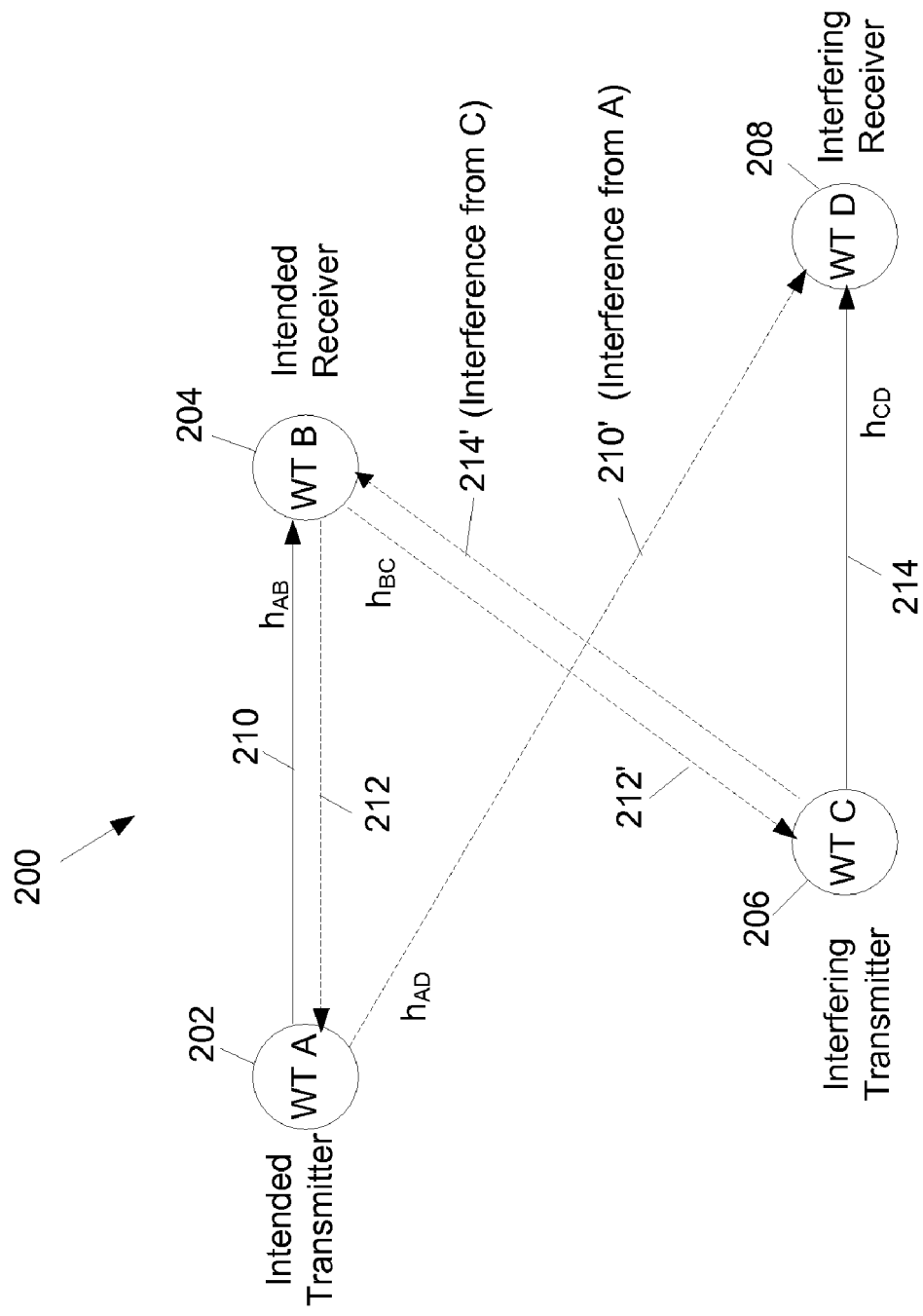
FIG. 2 is a block diagram illustrating an environment in which a plurality of wireless terminals may establish peer-to-peer communication connections that may cause interference to other nearby wireless terminals.

FIG. 2 is a block diagram illustrating an environment in which a plurality of wireless terminals may establish peer-to-peer communication connections that may cause interference to other nearby wireless terminals. A peer-to-peer network 200 may include a plurality of wireless terminals that may share and/or concurrently use a frequency spectrum. The shared frequency spectrum may include one or more transmission and/or control channels, with each transmission (traffic) channel having a corresponding traffic control channel. In one example, the traffic control channel may be used to send a traffic request for communications over a corresponding transmission (traffic) channel.

In one example, a first wireless terminal WT A 202 may be attempting to transmit 210 to a second wireless terminal WT B 204 while a third wireless terminal WT C 206 is concurrently attempting to transmit 214 to a fourth wireless terminal WT D 208 using the same traffic channel bandwidth resource. The first wireless terminal WT A 202 may be referred to as the intended transmitter, the second wireless terminal WT B 204 may be referred to as the intended receiver, and the third wireless terminal WT C 206 may be considered the interferer.

In this peer-to-peer network 200, a transmission and control channel pair may be shared by the plurality of the wireless terminals WT A, WT B, WT C, and WT D. However, because such transmission (traffic) and/or control channel is shared (e.g., frequency spectrum sharing) by the wireless terminals, it may also result in unwanted interference 214' and 210' among the wireless terminals. For instance, if both transmissions 210 and 214 actually take place, then the signal 214' from the third wireless terminal WT C 206 may be seen as interference to the second wireless terminal WT B 204 receiver and may degrade its ability to successfully recover the desired signal 210 from the first wireless terminal WT A 202. Therefore, certain interference management protocol is needed to manage interference from the third wireless terminal WT C 206 to the second wireless terminal WT B 204. One goal of the interference management protocol is to allow the third wireless terminal WT C 206 to transmit without creating excessive interference to the second wireless terminal WT B 204, thereby increasing the overall throughput and improving the system performance. Note that in the meantime, the first wireless terminal WT A 202 may also cause interference 210' to the fourth wireless terminal WT D 208, and a similar interference management protocol may also be used to control that interference.

Because there is no centralized traffic management authority, there is a chance that WT A 202 and WT C 206 may transmit on the same or overlapping channel, thereby causing interference with each other. For example, by coincidence, both WT A 202 and WT C 206 may use the same transmission CID. A transmission CID may be used to indicate a particular transmission channel (e.g., frequency or time slot) to a receiving terminal WT B 204 and 208. Consequently, when the same transmission CID is used by two terminals, they may also be concurrently transmitting on the same channel or overlapping channels. If both transmitting terminals WT A 202 and WT C 206 are within range of the receiver terminals WT B 204 and/or WT D 208, then the receiver terminals WT B 204 and/or WT D 208 may perceive interference.

In particular, a way is needed that allows multiple wireless terminals to choose channels within shared frequency the without distinguish between transmissions from an intended peer and those from an unintended peer.

According to one implementation, transmitter and/or receiver yielding may be implemented by devices in a peer-to-peer network that allows a device to backoff if it is likely to cause interference to other nearby devices of higher priority. Consequently, if the first connection 210 between the first device WT A 202 and second device WT B 204 has a higher priority than the second connection 214 between the third device WT C 206 and the fourth device WT D 208, the third device WT C 206 may implement transmitter yielding and/or the fourth device WT D 208 may implement receiver yielding. When yielding, a device determines whether its transmission power will unacceptably interfere with transmissions of other nearby devices. Such yielding may also take into account the relative priority of the different transmissions or peer-to-peer connections associated with such transmissions. For instance, a device may decide to yield only if it has a lower connection or transmission priority than another connection or transmission.

In one example of receiver yielding, a receiving device may not send an echo or reply transmission (e.g., in response to a transmission request) if its noise-to-signal ratio is too low, thereby preventing a corresponding interfering transmitting device from sending traffic to the receive device on the selected channel. In another example, the receiver device may indicate that a lower transmit power should be used by its corresponding transmitter device to avoid interference.

In one example of transmitter yielding, a transmitting device may determine whether its own transmissions will cause unacceptable interference to another device utilizing a shared channel, and if so, it may not send data transmissions on that shared channel.

In one example, wireless terminal WT A 202 may determine a transmit power $P_A$ for traffic data transmissions. Power $P_A$ need not be fixed and can be varied in accordance with certain criteria, such as traffic type, Quality of Service ("QoS") conditions, for example. In certain embodiments, the transmitter for a wireless terminal can vary its power without notifying the receiver in advance. In one embodiment, the transmit power $P_A$ may be defined according to the following equation:

$$P_A = \frac{C}{h_{AB}^\beta}, \qquad \text{(Equation 1)}$$

where C and $\beta$ are positive constants, and $h_{AB}$ is a decimal value less than or equal to one (1) that corresponds to the channel gain between the transmitting wireless terminal WT A 202 and the receiving wireless terminal WT B 204. Constant C may be chosen to optimize the signal-to-noise ratio SNR in a particular system, and constant $\beta$, in one embodiment, may be 0.5. In certain embodiments, a transmitter may determine its transmission power to a specific receiver in the peer discovery and/or the paging phase of the communication. A transmitter may also update its transmission power by inspecting the recent control channel feedback from a specific receiver during a previous transmission.

The first wireless terminal WT A 202 may transmit a traffic request 210 to the second wireless terminal WT B 204. The second wireless terminal WT B 204 receives the traffic request 210 which may have a received power $Pr_A = P_A * h_{AB}$, where $P_A$ is the transmit power of WT A 202 and $h_{AB}$ is the channel gain between WT A 202 and WT B 204, and which can also be represented as gain (WTA-WTB).

At the same time, the third wireless terminal WT C 206 may transmit a traffic request 214 to the fourth wireless terminal WT C 208 on the same control channel as the traffic request from WT A to WT B. Because the traffic request 214 is sent over a wireless medium on the same control channel, the second wireless terminal WT B 204 may also receive the traffic request 214' which may have a received power $Pr_C = P_C * h_{BC}$, where $P_C$ is the transmit power of WT C 206 and $h_{BC}$ is the channel gain between WT C 206 and WT B 204, and which can also be represented as gain (WTC-WTB).

If the ratio between the received power $Pr_C$ (from WT C) and the received power $Pr_A$ (from WT A) is greater than an acceptable interference threshold (i.e., $Pr_C/Pr_A$>threshold), then the second wireless terminal WT B 204 may yield the transmission channel to third wireless terminal WT C 206 by not sending an echo or reply transmission to the first wireless terminal WT A 202. For instance, this may be the case if the connection from WT C to WT D is higher priority than the connection from WT A to WT B.

Otherwise, the second wireless terminal WT B 204 may reply to the received traffic request 210 with an echo transmission 212 having a transmit power $P_B$ inversely proportional to the received power Pr (e.g., based on signal strength) received in the traffic request 210. For example, in one embodiment, the echo or reply transmission 212 from WT B 204 is set to a transmit power $P_B = C/(P_A * h_{AB})$, where C=1.

Because a shared frequency spectrum (e.g., communication channel) is used by multiple wireless terminals for wireless transmissions over the network 200, the third wireless terminal WT C 206 may also receive the echo or reply transmission 212' from neighboring second wireless terminal WT B 204. Although the echo transmission 212 is intended for the first wireless terminal WT A 202, other neighboring wireless terminals in the peer-to-peer network 200, including WT C 206, may also to receive the echo transmission 212'. Note that in some implementations, the first wireless terminal WT A 202 and third wireless terminal WT C 206 may utilize the same control and/or transmission channels (e.g., same frequency or timeslot) within the shared communication channel or frequency spectrum. In other implementations, the first wireless terminal WT A 202 and third wireless terminal WT C 206 may utilize different control and/or transmission channels within the shared communication channel but these different control and/or transmission channels maybe sufficiently close that the energy from transmissions in one channel (for a first wireless terminal) interferes with transmissions in another channel (for another wireless terminal).

At the third wireless terminal WT C 206, the received echo transmission 212' may have a received power $P_r = h_{BC}/(P_A * h_{AB})$, where $P_A$ is the transmit power of WT A 202, $h_{AB}$ is the channel gain between WT A 202 and WT B 204, and $h_{BC}$ is the channel gain between WT B 204 and WT C 206, and which can also be represented as GAIN (WTC-WTB). Note that it is the use of inversely proportional power in the echo transmission that allows the transmitting terminals to perform transmitter yielding based on the received echo transmissions.

The third wireless terminal WT C 206 may use the echo transmission 212' (and potentially other echo transmission for other wireless terminals) to ascertain whether it should transmit on a particular transmission channel (i.e., corresponding to the control channel being used) or allow a different terminal to use the transmission channel. That is, the third wireless terminal WT C 206 may use the echo transmission 212' to ascertain whether its own transmission (at a particular power Pc) may adversely affect transmissions between WT A and WT B on the same transmission channel. For example, upon receiving the echo transmission 212' from the second wireless terminal WT B 204, the third wireless terminal WT C 206 may determine the signal noise to interference plus noise ratio expected that may be perceived by the second wireless terminal WT B 204 as:

$$\frac{h_{AB} P_A}{h_{BC} P_C} < SINR. \qquad \text{(Equation 2)}$$

where $P_C$ is the proposed transmit power of the third wireless terminal WT C 206 (which need not be fixed) and the SINR threshold is a particular signal to interference plus noise ratio appropriate for the network 200. The remaining terms of Equation 2 are derived from the received power ($P_r$) from the second wireless WT B 204. If Equation 2 evaluates to true (i.e., $SINR > (P_A * h_{AB})/(P_C * h_{BC})$), then the third wireless terminal WT C 206 determines that its transmission to WT D 208 (e.g., or any other wireless terminal in network 200 on the same transmission channel as the transmission from WT A to WT B) would negatively impact the transmission from the first wireless terminal WT A 202 to the second wireless WT B 204. Therefore, the third wireless terminal WT C 206 may yield transmission to WT A 202. However, if Equation 2 evaluates to false (i.e., $SINR \leq (P_A * h_{AB})/(P_C * h_{BC})$), then the third wireless terminal WT C 206 determines that its transmission to WT D 208 (e.g., or any other wireless terminal in network 200 on the same transmission channel as the transmission from WT A to WT B) would not negatively impact the transmission from WT A 202 to WT B 204. Therefore, the third wireless terminal WT C 206 may proceed to transmitting on the same transmission channel as WT A 202.

According to one feature, the third wireless terminal WT C 206 may yield transmissions on a first transmission channel to the first wireless terminal WT A 202 only when WT A 202 has higher priority than WT C 206. The priority for each transmitting wireless terminal can be based on a particular priority scheme, such as priority based on its frequency index assignment, for example. In a priority-based arrangement, lower priority terminals or devices may yield to higher priority terminals or devices.

Note that other wireless terminals perform the same receiver yielding and transmitter yielding as described above. That is, this protocol may be understood, established, and/or implemented throughout the network so that other peer-to-peer transmitter/receiver devices also perform transmitter/receiver yielding. For example, the third wireless terminal WT C 206 may send a traffic request 215 at power $P_C$ to the fourth wireless terminal WT D 208. The fourth wireless terminal WT D 208 may perform receiver yielding if transmissions from WT C 206 are likely to interfere with transmissions from WT A 202 to WT B 204. That is, the fourth wireless terminal WT D 208 may not send an echo transmission to the third wireless terminal WT C 206, thereby declining the connection and yielding to the connection between WT A 202 and WT B 204. For instance, WT D 208 may receive the traffic request 214 at power $P_C * h_{DC}$ (where $h_{DC}$ is the channel gain between WT C and WT D) and the traffic request 210' at power $P_A * h_{AD}$ (where $h_{AD}$ is the channel gain between WT A and WT D). If $(P_C * h_{DC}) > (P_A * h_{AD})$ and the connection between WT A and WT B has a higher priority, the fourth wireless terminal WT D 208 may not send a reply echo transmission, thereby yielding the channel to the connection between WT A and WT B.

Thus, by implementing receiver yielding and/or transmitter yielding among the wireless terminals in a peer-to-peer network system, connection scheduling and prioritization may be achieved.

Channel Architecture

Figure 3:
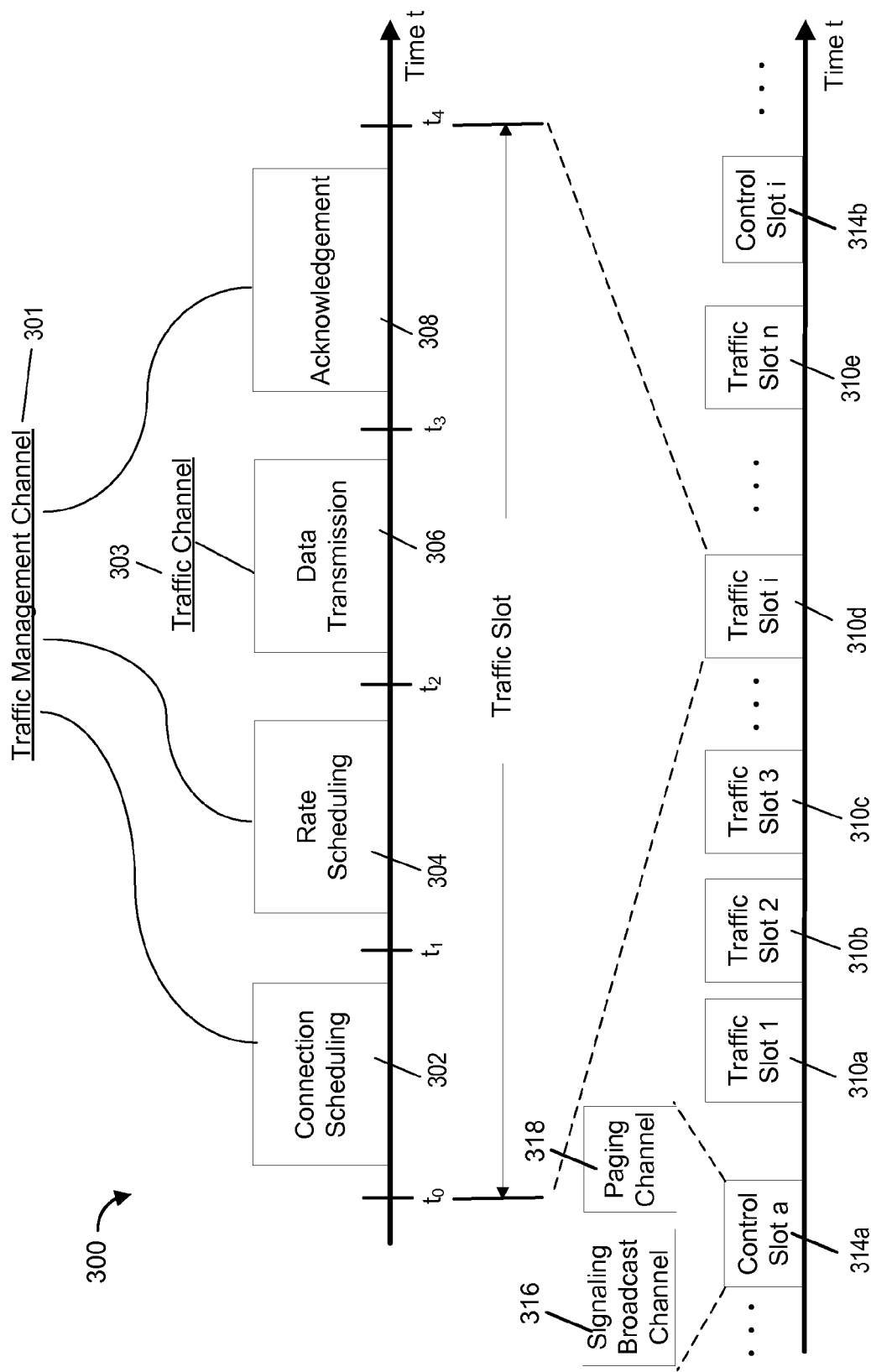
FIG. 3 illustrates one example of a transmission channel architecture that may be used by wireless terminals to transport control signaling and traffic for a peer-to-peer communication connection between wireless terminals.

FIG. 3 illustrates one example of a transmission channel architecture 300 that may be used by wireless terminals to transport control signaling and traffic for a peer-to-peer communication connection between wireless terminals. One example of a channel architecture includes a control slot 314 in inserted every so often between traffic slots 310. A peer-to-peer transmission channel 300 may include a plurality of traffic slots 310. Traffic slots 310 are time intervals during which a transmitter terminal may send peer-to-peer traffic data to a receiver terminal through the transmission channel.

Each traffic channel slot 310 may include a traffic management channel 301 and a traffic channel 303. The traffic management channel 301 may be used for signaling related to traffic data transmissions in the traffic channel 306. A connection scheduling segment 302, a rate scheduling segment 304, and an acknowledgment segment 308 are collectively referred to as the traffic management channel 301. A data transmission segment 306 may be referred to as the traffic channel 303. The connection scheduling segment 302, the rate scheduling segment 304, the data segment 306 and the acknowledgment 308 shown in FIG. 3 comprise a traffic slot.

The connection scheduling segment 302 may be used by a transmitter terminal to indicate to its receiver terminal (in a peer-to-peer connection) to indicate that it is ready to transmit traffic data. The rate scheduling segment 304 allows the transmitter/receiver terminals (in the peer-to-peer connection) to obtain a transmission rate and/or power to use in transmitting the traffic data. The data transmission segment 306 is then used to transmit the desired traffic data at the obtained transmission rate and/or power. The acknowledgement segment 308 may be used by the receiver terminal to indicate that the traffic data was received or not received in the data transmission segment 306. In one example, the time duration of a traffic slot is approximately two (2) milliseconds. As the traffic slots 310 repeat over time, the time sequence structure shown in FIG. 3 shows one period of the traffic slots. Note that, prior to sending traffic data in the traffic slot 310, the transmitter and receiver terminals may have established a peer-to-peer connection via a control slot 304 (in FIG. 3).

In the connection scheduling stage 302, the first device WT A 202 (FIG. 2) may transmit a first transmission request, which is heard by the second device WT B 204. The second device WT B 204 then transmits a second transmission request response, which is heard by the first device WT A 202 so that the first device knows that the second device is ready to receive traffic transmission from the first device. Both the first and the second devices WT A 202 and WT B 204 proceed to the second stage. Meanwhile, the second transmission request response is also heard by the third device, which will determine whether it will cause large enough interference to the second device if it chooses to proceed to transmit traffic channel. If it is determined that it will cause excessive interference, the third device will choose not to proceed to the second stage of the protocol. For the sake of description, it is assumed that the traffic transmission from the third device is of lower scheduling priority.

In the rate scheduling stage 304, the first device WT A 202 transmits a first pilot signal. If the third device WT C 206 does not drop out in the connection scheduling stage, it also transmits a second pilot signal. The second device WT B 204 determines a data rate it can support of the traffic transmission from the first device WT A 202 as a functional of the received signal strengths of the first pilot from the first device and the second pilot from the third device. The second device WT B then sends a rate report to the first device WT A 202 which includes the determined data rate.

In the data or traffic transmission state 306, the first device WT A 202 determines an actual data rate, as a function of the received rate report from the second device WT B 204, and transmits traffic to the second device WT B 204.

The transmission channel 300 may also include a control channel 314 comprising a plurality of control slots 314. A control slot 314 may serve to establish and maintain a peer-to-peer connection between the transmitter and receiver terminals. Each control slot 314 may include a Signaling Broadcast Channel 316 and a Paging Channel 318. The Signaling Broadcast Channel 316 may be used, for example, to indicate those peer-to-peer connection identifiers (CIDs) that are in use by nearby connections and to indicate whether a peer-to-peer connection is still alive. For example, the transmitter and receiver terminals may monitor the Signaling Broadcast Channel 316 to determine which CIDs are in use. The Paging Channel 318 is used by the transmitter and receiver terminals to establish new CIDs for a new peer-to-peer connection. The control slots 314 may occur at much longer intervals than traffic slots 310. For instance, the control slots 314 may occur every second or so.

Figure 4:
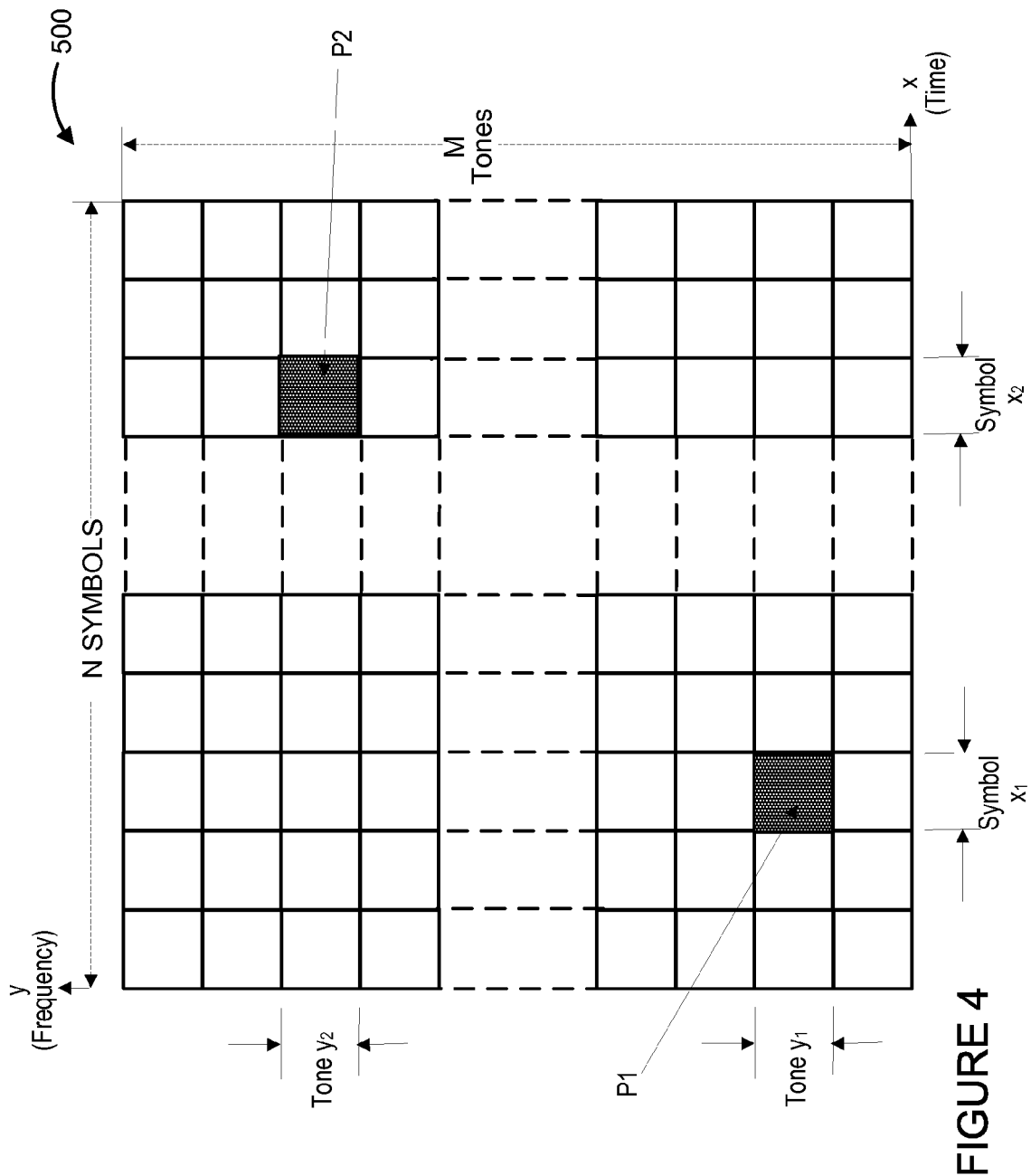
FIG. 4 illustrates an example time-frequency grid that may be used in signal transmissions over the channel architecture of FIG. 3.

FIG. 4 illustrates an example time-frequency grid 400 that may be used in signal transmissions over the channel architecture of FIG. 3. The exemplary signal may be an OFDM signal. The time-frequency grid 400 is the resource available for transmitting and/or receiving signals over a peer-to-peer network, e.g., during a control slot (e.g., control slot 314) and/or traffic channel slot (traffic slot 310 in FIG. 3 within traffic management channel 301). The x-axis represents time and may include N symbols (e.g., where N may be any integer), and the y-axis represents frequency and may include M tones (e.g., where M may be any integer).

A transmitter and/or receiver terminal may use the time-frequency grid 400 in the traffic management channel. For instance, the time-frequency grid may be considered a connection identifier CID resource space from which a terminal may select a CID resource unit corresponding to a CID. For example, in a traffic slot, a transmitter terminal may select a CID resource unit to signal a transmission request to the corresponding receiver terminal of the connection associated with the CID. Similarly, the receiver terminal may select a CID resource unit to signal a request response to the transmitter terminal. The CID resource units available for the transmitter terminal and for the receiver terminal may be partitioned a priori in a fixed manner so that the transmitter terminal selects a CID resource unit in a fixed subset of the total time-frequency grid of the traffic management channel, while the receiver terminal selects a CID resource unit in a different fixed subset of the total time-frequency grid 400 of the traffic management channel. Such CID resource space may be transmitted, for example, in a control slot 314 and/or traffic slot 310 (e.g., within traffic management channel 301).

A CID resource unit may be defined by a symbol-tone combination (e.g., a subset of tones within a symbol). According to an example, in a control slot or a traffic management portion of a traffic slot, a terminal may select a particular symbol (e.g., transmission time) for transmission based upon an identifier of the wireless terminal or a user who is utilizing the wireless terminal and/or a time variable (e.g., time counter) that may be commonly understood within a peer-to-peer network to identify the current slot interval. Further, a particular tone corresponding to the selected symbol may be determined (e.g., based upon the identifier and/or time variable). Pursuant to a further example, a hash function of the identifier and the time variable may yield the selected symbol position and/or tone position. For example, for a given peer-to-peer connection, when the time variable takes a first value, the hash function may yield symbol $x_1$ and tone $y_1$ such that the wireless terminal transmits a single-tone signal as the CID resource unit. When the time variable takes a second value, the hash function may yield symbol $x_2$ and tone $y_2$ such that the wireless terminal transmits a single-tone signal $P_2$ as the CID resource unit.

Interference Mitigation Protocol

In an ad hoc peer-to-peer communication system, multiple communications may take place using frequency spectrum resources shared in both space and time. Because of the distributed nature of the ad hoc peer-to-peer network, it may not always be possible to control the channel allocations (e.g., slots) used for transmissions between the wireless terminals. In wireless networks where a central authority does not exist, interference avoidance and/or management is a key feature to maintain the efficiency of the network performance.

In general, for a first terminal to send traffic to a second terminal over a peer-to-peer connection, it first sends a traffic request signal in the traffic management channel 301 (FIG. 3). Upon receiving the traffic request signal from the first terminal and possible traffic request signals from other terminals in the vicinity that intend to use the same traffic slot as the first terminal, the second terminal may send back a traffic request response signal, also in the traffic management channel 301.

It is also possible that the second terminal does not send back the traffic request response signal if it senses that another higher priority transmitter is also requesting use of the current traffic slot. After the first terminal receives the traffic request signal from the second terminal and possibly other traffic request signals from other terminals in the peer-to-peer network, it will make a decision on whether or not to use the current traffic slot. The decision is made by measuring the signal strength of the traffic request response signals from higher priority receiver terminals in the peer-to-peer network. If any of the signals has strength above a certain threshold, the first terminal thinks that it is creating a strong interference for the corresponding higher priority receiver terminal and will decide to refrain using the current transmit slot.

Figure 5:
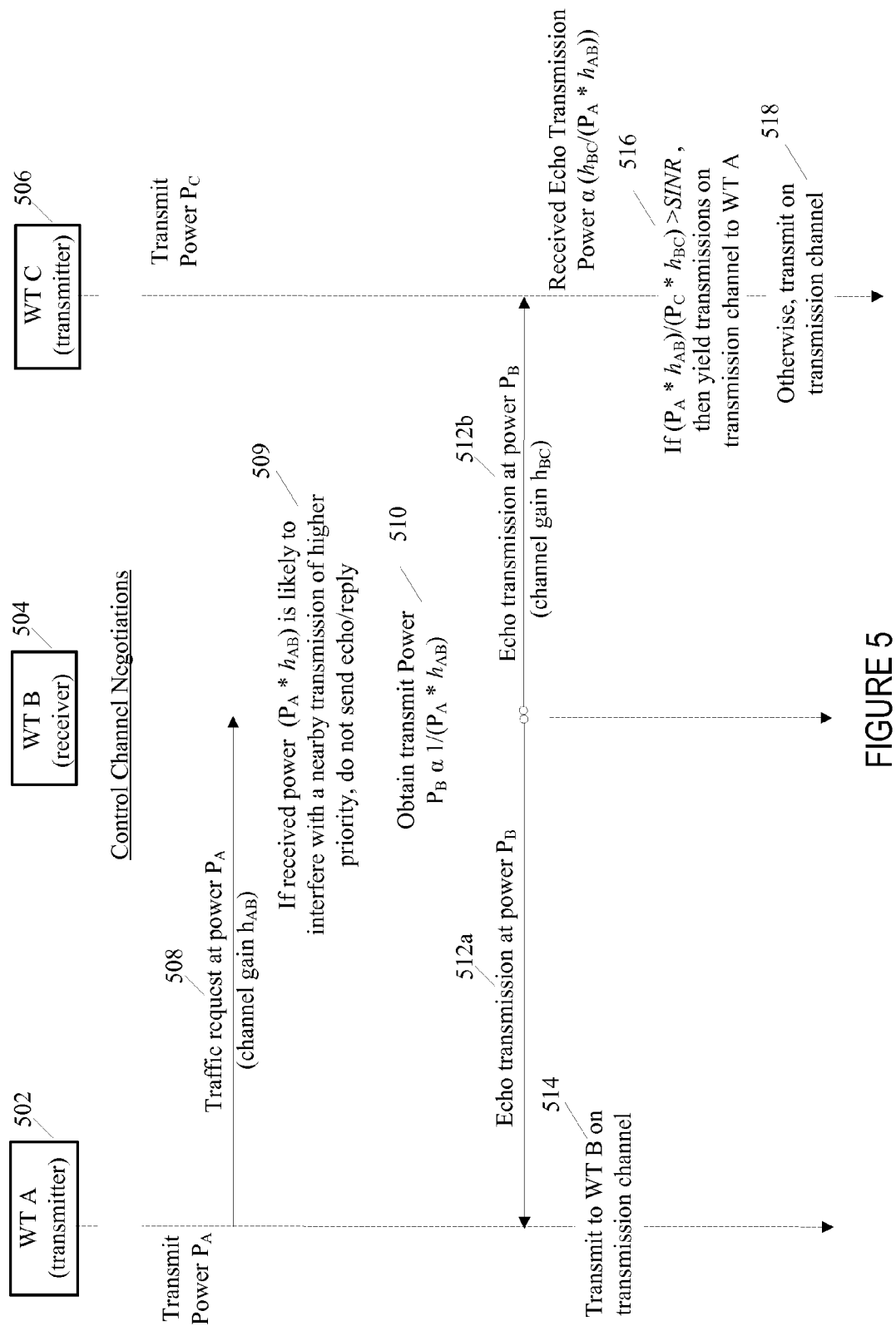
FIG. 5 is a flow diagram illustrating the operation of various wireless terminals in an ad hoc peer-to-peer network that facilitates connection scheduling where a plurality of wireless terminals share a communication channel.

FIG. 5 is a flow diagram illustrating the operation of various wireless terminals in an ad hoc peer-to-peer network that facilitates connection scheduling where a plurality of wireless terminals share a communication channel. In this example, it is assumed that the shared communication channel includes a control channel and a transmission channel. A first wireless terminal WT A 502 may select a transmit power $P_A$ and transmits a traffic request at power $P_A$ 508 (or at a power proportional to $P_A$) over the control channel to a second wireless terminal WT B 504. Such traffic request may serve to establish a peer-to-peer connection between WT A 502 and WT B 504 over a transmission channel associated with the control channel. In this example, the channel gain between WT A 502 and WT B 504 is denoted by $h_{AB}$. Upon receiving the traffic request 508, the second wireless terminal WT B 504 may determine whether the received power ($P_A*h_{AB}$) of the traffic request is likely to interfere with a nearby transmissions of higher priority and, if so, does not send an echo or reply transmission 509 to the first wireless terminal WT A. For example, WT B may estimate the signal to interference ratio, where the desired signal power is ($P_A*h_{AB}$), while the interference power is determined by the received power of other traffic requests with higher priority. Those traffic requests are sent by other transmitters to their corresponding receivers. Otherwise, the second wireless terminal WT B may obtain a transmit power $P_B$ that is proportional to $1/(P_A*h_{AB})$ 510. The second wireless terminal WT B 504 may then broadcast a reply or echo transmission at power $P_B$ 512 (denoted 512a or 512b) in response to the traffic request from WT A. The first wireless terminal 502 may then transmit to the second wireless terminal WT B 504 over the transmission channel 514 associated with the control channel.

Because the echo transmission 512 (denoted 512a or 512b) is broadcast over a shared communication channel, other nearby devices, such as third wireless terminal WT C 506, may receive the echo transmissions. If the third wireless terminal WT C 506 is intending to use the same communication channel (or frequency spectrum) to transmit to other devices, it may cause unacceptable interference to the transmissions between WT A and WT B. Here, it is assumed that the connection of WT C is of lower priority than the connection between WT A and WT B in the present traffic slot. Thus, WT C may need to make sure its intended traffic transmission does not create excessive to the receiver device WT B. Therefore, the third wireless terminal WT C 506 may ascertain a relative measure between its transmission ($P_C*h_{BC}$) and the transmission from WT A ($P_A*h_{AB}$), as received by the second wireless terminal WT B, where $P_C$ is the transmission power for the third wireless terminal WT C. Since the power of the echo transmission as received at the third wireless terminal WT C is proportional to the channel gain $h_{BC}$ and the echo transmission power $P_B$ or $h_{BC}/(P_A*h_{AB})$, a ratio $(P_A*h_{AB})/(P_C*h_{BC})$ may be ascertained. The third wireless terminal WT C 506 can use this ratio as an indicator of whether its transmissions may negatively impact reception of the transmissions from the first wireless terminal WT A 502 to the second wireless terminal WT B 504. For instance, if the ratio $(P_A*h_{AB})/(P_C*h_{BC})$ is greater than a signal to interference plus noise ratio SINR threshold, then the third wireless terminal WT C 506 may conclude that its transmissions will have an unacceptably negative impact on the transmissions from WT A 502 to WT B 504 and yield the transmission channel to the first wireless terminal WT A 516. Otherwise, if the ratio $(P_A*h_{AB})/(P_C*h_{BC})$ is less than or equal the SINR threshold, it may transmit on the shared transmission channel (e.g., to WT B or another device) 518.

By having each wireless terminal in a peer-to-peer network follow the procedures illustrated in FIGS. 3 and 4, excessive interference can be avoided since wireless terminals that may cause interference to higher priority wireless terminals will not transmit over the shared transmission channel, allowing the higher priority wireless terminal(s) to use that transmission channel instead. Transmission priority for each transmitting wireless terminal may be based on a particular priority scheme, such as priority based on its frequency index assignment, for example. In a priority-based arrangement, lower priority terminals or devices may yield to higher priority terminals or devices.

In addition to connection prioritizing and/or scheduling, a wireless terminal may also adjust its transmit power to avoid causing interference to nearby wireless terminals. In some implementations, a wireless terminal may include a variable power transmitter and a receiver.

In some implementations, a transmit power is obtained by a wireless terminal and used for communications over its control channel and the corresponding transmission channel. Note that, in one example, the same transmit power is used in the control channel and the traffic channel, thereby facilitating connection scheduling.

The transmit power may be determined in different ways. For instance, the transmit power may be a constant power $P_0$, or power controlled (e.g., power $P_0$ divided by channel gain h), or a function of power $P_0$ and channel gain h (e.g., $P_0/\sqrt{h}$). Note that the channel gain h is a value between zero (0) and one (1) (e.g., $0 \leq h \leq 1$) and may be obtained by the transmitter wireless terminal beforehand, for example, during paging or discovery phases of establishing the peer-to-peer connection.

In a first scenario, a wireless terminal may transmit at constant power $P_0$. However, under constant transmit power $P_0$ the wireless terminal may create more interference than necessary. This is because the constant transmit power $P_0$ is typically selected for the longest communication range which is wasted in shorter range communications. Therefore, unless a connection has the highest priority, use of constant power $P_0$ will cause frequent transmitter yielding and/or receiver yielding since it will cause interference with other connections. Thus, a connection using constant transmit power $P_0$ may be active for very small periods of time scheduled since transmitter yielding and/or receiver yielding will cause other connection (e.g., those that cause less interference or have higher priority) to be favored. Additionally, the use of a constant transmit power is also wasteful of limited power resources often available to mobile or portable wireless terminals.

In a second scenario, a wireless terminal may transmit at a controlled power $P_0/h$ (taking into account channel gain h) so that the received power is constant. Under this scenario, the power may be adjusted based on channel gain. However, under this approach, the controlled transmit power $P_0/h$ may be lower than ideal, especially where the channel is susceptible to sporadic interference.

In a third scenario, a wireless terminal may transmit at a scaled power $P_{scaled}=P_0/f(h)$ (where f(h) is a function of channel gain h). For instance, the scaled transmit power $P_{scaled}$ may be a predetermined constant power $P_0$, or a function of measured channel gain, e.g., inversely proportional to channel gain $C*P_0/h$, or to the square root of channel gain $D*(P_0/\sqrt{h})$, where C and D may be different scaling factors for antenna gains (e.g., for receiver and/or transmitter antennas). In one example, by adjusting transmit power relative to the constant transmit power, the wireless terminal WT A 502 may reduce interference to other wireless terminals and, consequently, may have the opportunity to have transmissions scheduled more often.

Figure 6:
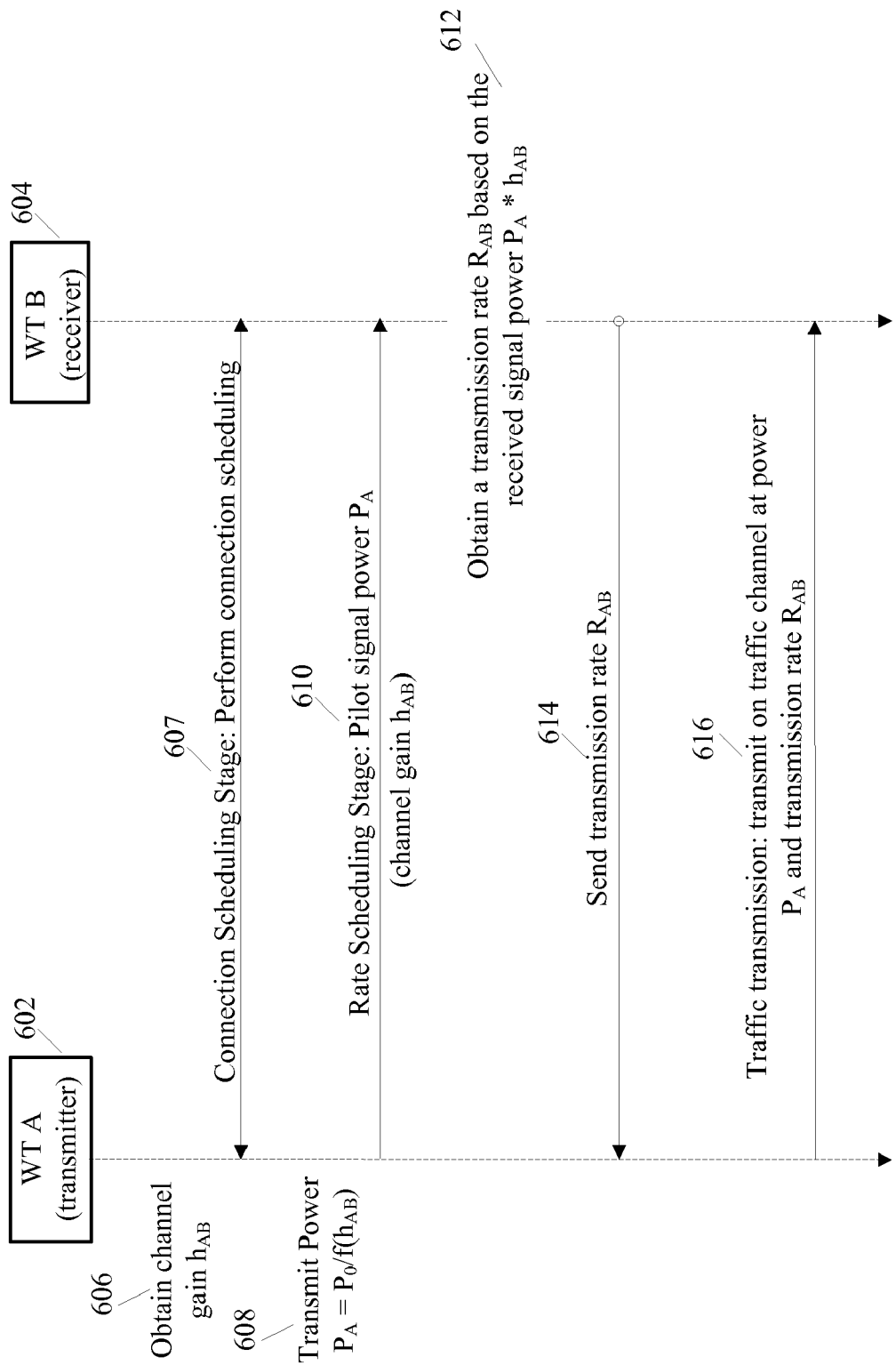
FIG. 6 is a flow diagram illustrating how transmit power scaling may be implemented for a peer-to-peer connection between two wireless terminals.

FIG. 6 is a flow diagram illustrating how transmit power scaling may be implemented for a peer-to-peer connection between two wireless terminals. A first wireless terminal WT A 602 may obtain a channel gain $h_{AB}$ 606 for the communication channel to a second wireless terminal WT B 604. The wireless terminal WT A 602 may obtain a scaled transmit power $P_A$ based on a constant power $P_0$ and a function f of the channel gain $h_{AB}$ 608. For instance, in one example the transmit power may be $P_A=P_0/\text{square\_root}(h_{AB})$.

Optionally, connection scheduling may be performed 607 for the connection between the wireless terminals WT A 602 and WT B 604. For example, such connection scheduling may be performed according to a transmitter yielding and/or receiver yielding scheme as illustrated in FIGS. 3 and 4, and/or during the connection scheduling segment 302 of FIG. 3.

The first wireless terminal WT A 602 may then transmit a pilot signal at a power $C*P_A$ 610 to the second wireless terminal WT B 604. That is, the total pilot transmit power may have a fixed relationship with the total data transmit power of the corresponding data traffic segment. For example, depending on the signal format of the pilot signal, if the pilot is a single-tone signal while the data signal is spread across many tones, then the per tone power may be higher for the pilot signal than for the data signal.

The second wireless terminal WT B 604 may then obtain or select a transmission rate $R_{AB}$ based on the received signal power $P_A*h_{AB}$ 612. This transmission rate $R_{AB}$ is sent 614 to the first wireless terminal WT A 602 which can then transmit on a shared transmission channel at power $P_A$ and at the transmission rate $R_{AB}$ 616.

Under the interference mitigation protocol described herein, there is a relationship between the power a first terminal uses to send traffic request signal to a second terminal and the power the first terminal uses to send the traffic data in the traffic slot. The relationship between the two powers is universally well understood throughout the network since the powers will directly affect the receiver yielding decisions made at the receiver terminals and may also affect the transmitter yielding decisions at other transmitter terminals. In some examples, the relationship is to enforce the transmit power of the traffic request signal to be proportional to the transmit power of the actual traffic data transmission, where the ratio between the two may be constant and known to all the terminals in the network. In one example, the constant is equal to 1.

However, there may be reasons that the transmitter terminal may want to adjust the above power ratio. In one example, the transmitter terminal may want to reduce the transmission power of the traffic slot, so that it would cause less interference to other high priority traffic transmissions—this way, the transmitter terminal may not have to TX yield to those high priority traffic transmissions. In another example, if the transmitter terminal does not have much data to send, using large transmission power in the traffic block is wasteful. In the above examples, it is desired that the transmitter terminal reduces the traffic transmission power. For example, suppose that the transmitter terminal transmits the traffic signal in the entire traffic slot. When the transmitter terminal reduces the transmission power, although the transmission power per degree of freedom (e.g., per tone in an OFDM symbol) is reduced, the transmitter terminal can use a low coding rate to compensate the reduced SNR per degree of freedom and therefore maintain the proper Eb/N0 requirement. In effect, the transmitter terminal adjusts the coding rate, and therefore the amount of data to be transported in the data block, in order to accommodate the reduction in transmission power.

Overview of Small Packet Transmissions in Peer-to-Peer Network

In some instances, a device may wish to transmit a small amount of data that is smaller than a normal traffic frame size or length. Consequently, the small amount of data can be transmitted in a "small packet" rather than a normal traffic frame. As used herein, a "small packet" may include a packet or amount of data that is smaller than a maximum threshold length. Such "small packet" has a length that is smaller, by a pre-determined amount, than a normal frame length. For instance, the small packet may have a length or size that is smaller by fifty percent or smaller than the normal frame size. In other example, a typical frame size may be 4000 bits long and a small packet is 1000 bits or less.

When transmitting a small packet, a transmitter intends to use less traffic transmission power than when transmitting a normal packet, so that the small packet traffic transmission causes less interference to other traffic transmissions in the vicinity. The reason that the transmitter is able to reduce transmission power without scarifying communication reliability is that the transmitter may use low coding rate to maintain the required Eb/N0. However, the corresponding control information, e.g., transmission request, may need to be transmitted at the same power as it would have had the transmission been a normal or large packet transmission. This is because the same amount of control information needs to be communicated irrespective of whether traffic is a small or normal packet. Under normal receiver yielding, a receiver device may seek to reduce a transmitter device's traffic transmission power to minimize interference to other nearby device. However, under an alternative approach, if the transmitter device knows that it is going to send a small packet, it can signal this intent to the receiver device by using a separate bit. This bit for example can be transmitted using position based coding. This bit indicator means that the transmitter device will transmit the small packet at a lower power than other types of transmissions, without the need for the receiver terminal to indicate a lower power via receiver yielding.

A rate prediction algorithm can be split into a channel measurement stage and an interference measurement stage. A small packet transmitter device uses the full power for the channel measurement stage whereas it uses a reduced power for the interference measurement stage. This has the advantage of providing a good channel estimate, since the transmitter device used the full power, without compromising on the interference measurement since the transmitter used the reduced power in the interference measurement part that will also be used for the data transmission.

In addition to lowering the transmit power by a fixed amount, additional power back off for the transmitter device can be signaled by the receiver device in a rate feedback stage. For a small packet transmission, the rate granularity required would in general be much smaller than the normal or large packet transmission. The fact that the transmission is a small packet transmission has already been communicated to the receiver device during the rate scheduling stage. Therefore, the remaining bits in the rate feedback can be used to indicate to the intended transmitter device to further reduce the power of the transmission. This may not improve the rates for other nearby devices, but may reduce the interference caused to the other receiver devices and also increases the battery life of the transmitter device.

Transmit Power Backoff for Small Packet Transmission

According to a first scheme, the transmitter power is reduced since a smaller packet will require much lower SNR. This will maintain the $E\_b/N\_0$ for the transmission as well as minimize the interference caused to other wireless communications happening in the same spectrum.

The fact that the transmitter power is reduced for a small packet can be signaled in a control channel so that other nearby devices can use this information for their scheduling and rate prediction algorithms. As in the baseline protocol described in FIGS. 3 and 4, three stages may be employed.

Figure 7:
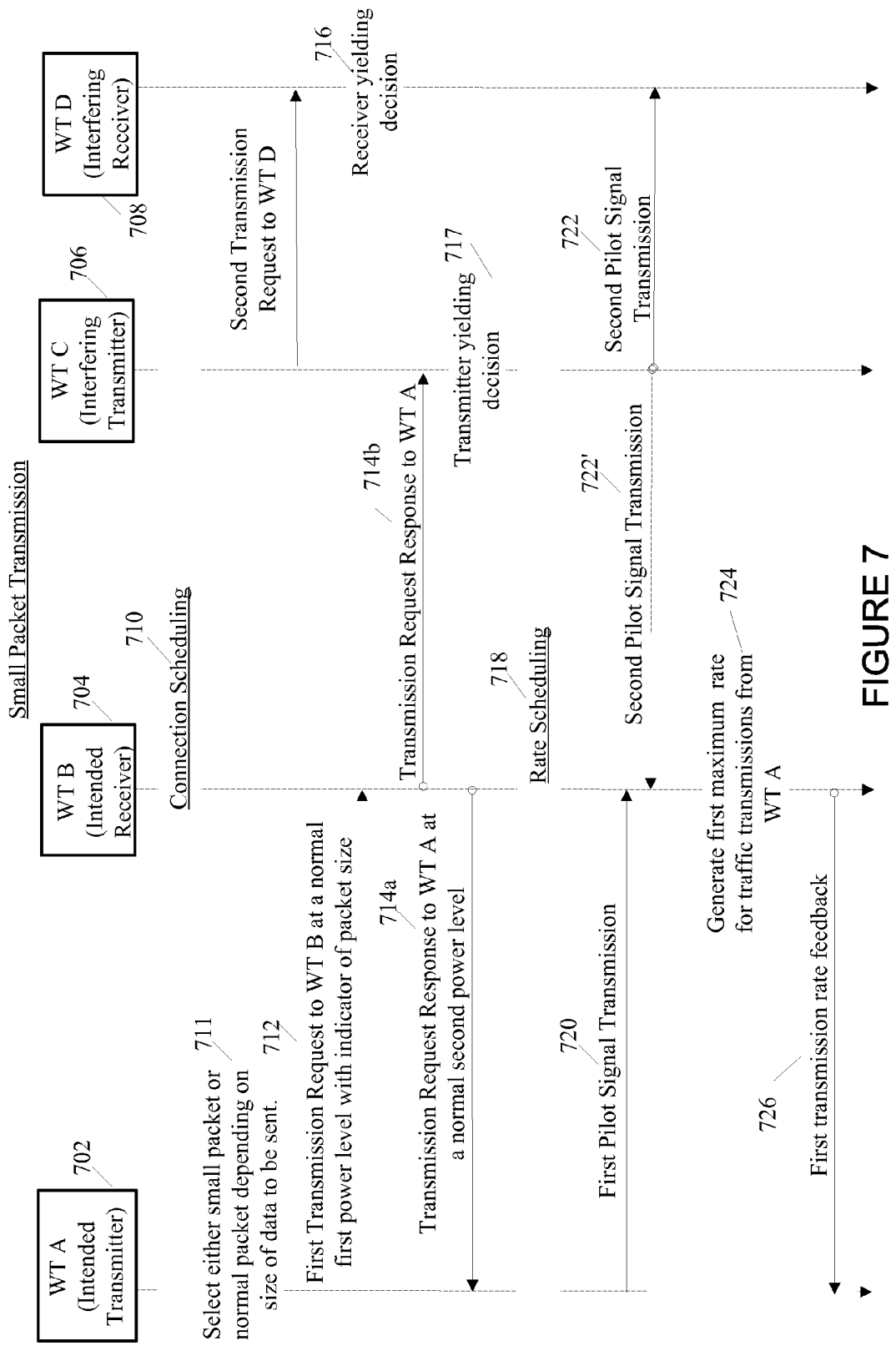
FIG. 7 illustrates an example of how power may be reduced when transmitting a small packet in a peer-to-peer network.

FIG. 7 illustrates an example of how power may be reduced when transmitting a small packet in a peer-to-peer network. In this example, a first device WT A 702 has a peer-to-peer connection with a second device WT B 704 while a third device WT C 706 has a peer-to-peer connection with a fourth device WT D 708. Since the devices operate within range of each other in a shared frequency spectrum, transmissions from the third device WT C 706 to the fourth device WT D 708 are considered "interfering" to transmissions from the first device WT A 702 to the second device WT B 704. In this example, the first device WT A 702 intends to transmit a small packet to the second device WT B 704 over their peer-to-peer connection. Such small packet size or length may be an amount of data that is smaller than a threshold size or data length.

The first device WT A 702 first determines whether the data traffic to be transmitted in the current time slot is "small" (e.g., smaller than a certain threshold size) or not and select either a small packet or normal packet indicator depending on size of data traffic to be sent 711.

During a connection scheduling stage 710, the first device WT A 702 uses the same first power level in the transmit request resource as it does for any other normal size or length packet transmission. That is, the first device WT A sends a first transmission request to the second device WT B at the first power level along with a packet size indicator 712. Such indicator may be a single bit, or one or two phases that indicates either a normal or small packet. In another example, the transmitter device may have two tones to signal the traffic request, in which case the transmitter may use a first tone to send a reference symbol and a second tone to signal information related to whether the corresponding traffic is a small or normal packet, and if it is a small packet, how much power backoff (i.e., power reduction) the transmitter will use in the traffic signal relative to the power used for a normal packet traffic. In one embodiment, the information is signaled in the phase of the second tone. For example, the phase of the second tone can be discrete QPSK, where 00 (phase=0 degree) represents a normal packet, 01, 10, 11 (phase=90, 180, 270 degrees), all represent a small packet with different power backoff values. In another example, the phase of the second tone may not be discrete. For example, phase=0 degree represents a normal packet, while phase is anywhere from 90 to 270 degree representing a small packet traffic. Phase=90 or 270 degree represent a minimum or maximum value of power backoff. The phase value in between 90 and 270 degrees represents a power backoff value between the minimum and the maximum values. This way, the phase can be used to signal much more possible power backoff values. In a corresponding transmit response resource, the second device WT B 704 echoes the request response using the same second power level as it uses for normal size or length packet transmission. That is, the second device WT B sends a first transmission request response to the first device WT A at the normal second power level 714. Note that, in one example, the second power level may be inversely proportional to the first power level. It is desirable, though not required, for the small packet transmitter first device WT A 702 to also indicate the nature of the transmission by marking one bit in transmit request message.

For the transmitter yielding decision 717, the transmitter devices WT A 702 and WT C 806 operate as discussed under the baseline protocol. For instance, the lower priority third device WT C 706 may detect the request response 714*b* and determine whether its own data traffic transmission in the same traffic slot will cause unacceptable interference to the second device WT B 704. For example, since the request response 714 is inversely proportional to the transmit power of the first device WT A 702, the third device WT C 706 knows whether its own transmit power will cause unacceptable interference to the second device WT B 704.

For the receiver yielding decision 716, the receiver devices WT B 704 and WT D 708 have to first decide the nature of the interfering transmissions, if available, and take that into account in making the yielding decision. For example, the receiver fourth device WT D 708 may sense a higher priority transmitter WT A 702 with strong received power in the request signal but it also finds out that the transmission (from WT A to WT B) is a small packet transmission. The fourth device WT D 708 can find this out because this information is included in the first transmission request. In this case, the fourth device WT D 708 might not have to yield since the traffic transmission power of the transmitter WT A 702 will be much smaller than the first power level it used in the connection scheduling stage 710. Furthermore, when the transmitter WT A 702 indicates the amount of power backoff, the fourth device WT D 708 can predict the interference power caused by the traffic signal from WT A by using the measurement from the traffic request signal 712 and the decoded power backoff. For example, if the measured power of the received traffic request signal is X and the power backoff announced by WT A is Y, then the predicted interference power may be X/Y. For example, if Y is 10 dB, then the predicted interference power is 10 times smaller than the measured power of the received traffic request signal.

In the above discussion, it is assumed that WT C to WT D traffic is of lower priority than WT A to WT B traffic so that WT D needs to consider the receiver yielding. In another scenario where WT A to WT B traffic is of lower priority than WT C to WT D traffic, WT A needs to consider the transmitter yielding. For example, the transmitter device WT A 702 may sense a higher priority receiver WT D 708 with strong received power in the request response signal but it also knows that the transmission (from WT A to WT B) is a small packet transmission. In this case, WT A 702 might not have to yield since the traffic transmission power of the transmitter WT A 702 will be much smaller than the first power level it used in the connection scheduling stage 710 so that WT A may not cause as much as interference to WT D. For example, if the power backoff used by WT A is 10 dB, then the interference from WT A to WT D is ten (10) times smaller when WT A is going to transmit a small packet traffic than when WT A is going to transmit a normal packet traffic.

For the rate scheduling stage 718, the rate prediction algorithm is split in two parts: first a channel measurement part, and second an interference measurement part. The small packet transmitter first device WT A 702 uses the full power for the channel measurement part but uses the reduced power for the interference measurement part. This has the advantage of providing a good channel estimate, since the transmitter first device WT A used the full power, without compromising the interference measurement since the transmitter WT A 702 used the reduced power in the interference measurement part that will also be used for the data transmission.

In the rate feedback of this stage, pilot signals 720 and 722 are broadcast by the transmitter first device WT A 702 and third device WT C 706. The second device WT B 704 can utilize the signal strength of the received pilots to generate a first maximum rate for traffic transmissions 724 from the first device WT A 702. This first maximum rate is provided 726 to the first device WT A 702. Additional power back off for the transmitter device WT A 702 can also be signaled by the receiver device WT B 704, since now the second device WT B 704 has a more precise estimation of the channel condition. For a small packet transmission, the rate granularity required would in general be much smaller than the large packet transmission. And the fact that the transmission is a small packet transmission has already been communicated to the receiver during the connection scheduling stage. Therefore, remaining bits in the rate feedback can be used to indicate to the intended transmitter to further reduce the power of the transmission. This will not improve the rates for other devices, but will reduce the interference caused to other devices and also increase the battery life of the device.

Flash Signaling for Small Packet Transmission

According to one example, flash signaling (non-Gaussian) may be used to transmit small packets over the data burst of a large size. That is, an indication of a packet size may be provided by using one of either Gaussian signaling or flash signaling. In the connection scheduling stage, one option is to let the small-packet transmitter WT A indicate its intention to transmit a flash signaling packet by marking one bit in the transmit request message. The small packet receiver WT B monitors the transmit request resource and echoes a transmit request response, which also carries the information of the nature of the granted transmission.

A set of preferable rules for making transmitter and receiver yielding decisions may be defined among devices.

First, for receiver yielding decision at small packet receivers, a different threshold is used on the received power in the transmit request resource for making yielding decision to interfering normal transmission as compared to the threshold used to receive a normal size packet transmission. For receiver yielding decisions at normal packet receivers, the baseline protocol (described in FIGS. 2, 3, 5, and 6) is used to make yielding decision against other interfering normal packet transmissions. However, the normal packet receiver uses a different threshold to decide whether to yield to a higher priority interfering flash transmission. The threshold is chosen such that the flash transmission does not desense the reception from its intended transmitter. In addition, the yielding decision can also take into account of the loss of degrees of freedom due to the presence of higher priority flash signaling devices.

Second, for transmitter yielding decision against other interfering flash signaling transmissions with higher priority should be related to the number of such interfering transmissions with higher priority. This is because the decoding performance of flash signaling is vulnerable when coexisting with too many other flash signaling devices. For transmitter yielding decision at a small packet transmitter, the transmitter monitors the request responses in the transmission request response resource. Similarly, the transmitter uses a different power threshold to decide whether to yield to an interfering normal packet transmission as compared to the threshold it would use if the transmission is for a normal packet. More precisely, the yielding decision is made when the flash signaling transmitter realizes that it might desense a higher priority normal packet transmission. For transmitter yielding decision at normal packet transmitter, the transmitter uses the baseline protocol (described in FIGS. 2, 3, 5, and 6) to decide whether to yield to another normal packet transmission. It will use a different threshold to decide whether to yield to a small packet transmission.

Another choice for the connection scheduling is to use the same signaling as in the baseline protocol (described in FIGS. 2, 3, 5, and 6) for both small packet and normal packet transmissions. However, for the small packet transmitter, the transmitter device monitors the transmission request response resource and makes a decision then about whether to use flash signaling or not. A small packet transmitter might decide to use flash signaling if all or part of the following conditions are satisfied:

A. The number of bits contained in the current packet can be transmitted using flash signaling (e.g., the data traffic packet is smaller than a threshold size).

B. A normal transmission is not allowed, e.g., the transmitter would have to yield to other higher priority transmissions if the baseline protocol is used.

C. The flash signaling transmission would not desense any other higher priority transmissions.

In the rate scheduling stage, if the flash signaling decision is made at the end of the connection scheduling stage, it is necessary for the transmitter to indicate its intention to use flash signaling here. An easy way to do this is for the transmitter to use a different pilot scheme other than the pilot scheme used by normal packet transmissions. For example, a normal packet transmission can use pseudo-random noise (PN)-like pilot signal in rate scheduling stage while a flash signaling format can use beacon-type pilots. The intended receiver has to make a binary hypothesis testing to check the format of the data transmission. However, the total power to be used on the pilots are the same for both pilot formats so that other coexisting receivers can still get a good estimate of the interference caused by the flash signaling transmitter.

In the traffic transmission stage, the small packet transmitter, if deciding to use Flash signaling transmission, will only put power on a subset of the degrees of freedom in the current data burst. The data information will be carried over the position of these degrees of freedom only or a combination of position and phase difference. To use the phase information, part of the degrees of freedom used in flash signaling will serve as pilots for the total transmission. When such a scheme is used, a small packet can transmit around 400-600 bits over a data burst of 6000 degrees of freedom without causing much disturbance to the neighboring normal transmissions, i.e., the other transmissions will take the degrees of freedom used by flash signaling as erasures, which can be recovered from coding.

Flash Signaling and Detection

In flash signaling, there are some techniques that can be used to improve the performance when the interference is from other flash signaling users. To describe these techniques, a typical non-Gaussian signaling scheme is outlined. Consider a data segment with 6400 degrees of freedom. It is divided into 100 disjoint segments of size 64 each. Now the transmitter modulates 6 coded bits onto one segment using position coding ($6=\log_2(64)$). That is, the transmitter will send high energy on a tone corresponding to the 6 coded bits.

Thus, this scheme provides a way to send 6*100 coded bits. These coded bits for example can be generated from an inner code of dimension (600, 400). The receiver makes hard/soft decisions for each segment to determine the 6 coded bits that were sent, and then feeds this information to a decoder for the inner code. A good choice for the inner code is a Reed-Solomon code.

Now, consider the scenario in which a first device WT A is sending a small packet to a second device WT B using non-Gaussian signaling, and a third device WT C is sending a small packet to a fourth device WT D using non-Gaussian signaling. So, the signal from third device WT C acts as interference to the second device WT B. Thus, second device WT B is typically going to receive two high-energy tones in each segment and it has to decide which tone was sent by first device WT A and which tone is the interference sent by the third device WT C. In one example, the phase of the signal can be used to make this distinction. Note that the position/power is being used to convey the information, hence the remaining dimension, phase, can be used to deal with the interference. Note that in this scenario, the behaviors of the first device WT A and third device WT C are similar and that of the second device B and the fourth device D are similar.

For interference management, three schemes are proposed.

Scheme 1:

A first device WT A sends a high energy tone at a fixed power (P1) and a fixed phase (theta1) for all segments. Thus, the signal S1 received for the high energy tone at the second device WT B is S1=sqrt(P1)*exp(j*theta1). Similarly, I3 may be the interference that the second device WT B receives from the third device C. The complex numbers S1 and I3 are known to the second device WT B which can be done, for example, through the pilot control channel or connection scheduling channel or a combination of both. The second device WT B then uses S1 and I3 to determine the high energy tone that was sent by the first device WT A. The idea is that the received signal should have high energy, and be closer to S1, but not close to I3. Three canonical rules can be used by the second device WT B for this purpose.

First, for each segment, determine the tone where the received signal is closest in the Euclidean distance sense to S1, and declare that as the transmitted signal. That is, tone t that is:

$$\text{argmax} \|y(t)-S1\|^2 \quad \text{(Rule 1)}$$

t=1, . . . , 64

Second, for each segment, determine the tone t that is $$\text{Argmax} \|y(t)\|^2 - \|y(t)-S1\|^2 \quad \text{(Rule 1)}$$

t=1, . . . , 64

Third, for each segment, determine the tone t1 that is $$\text{argmax} \|y(t)\|^2 - \|y(t)-S1-I3\|^2 \text{ if } t1=t2=t \|y(t1)\|^2 - \|y(t1)-S1\|^2 + \|y(t2)\|^2 - \|y(t2)-I3\|^2 \text{ o/w} \quad \text{(Rule 3)}$$

t1=1, . . . 64
t2=1, . . . 64

Note that Rule 1, and Rule 2 do not use I3, where as Rule 3 which is a generalization of Rule 2 uses I3 and hence performs better, but is more complicated to evaluate.

Scheme 2:

The first device WT A sends the high energy tone at a fixed power (P1), but a phase (theta1(s)) that is changing pseudo-randomly with segment s. Thus, the signal received for the high energy tone at the second device WT B for segment s is S1(s)=sqrt(P1)*exp(j*theta1(s)). Similarly I3(s) is the interference that the second device WT B receives from the third device WT C. The complex numbers S1(s) and I3(s) are known to the second device WT B for each segment which can be done, for example, through the pilot control channel/link scheduling or a combination of both. The second device WT B then uses S1(s) and I3(s) to determine the high energy tone that was sent by first device WT A. The idea is that the received signal should be have high energy, and be closer to S1(s), but not close to I3(s). Three canonical rules can be used by the second device WT B for this purpose.

Rule 1—For each segment, s, determine the tone where the received signal is closest in the Euclidean distance sense to S1, and declare that as the transmitted signal.

$$\text{argmax} \|y(t)-S1(s)\|^2$$

t=1, . . . , 64

Rule 2—For each segment, s, determine the tone t that is $$\text{argmax} \|y(t)\|^2 - \|y(t)-S1(s)\|^2$$

t=1, . . . , 64

Rule 3—For each segment, s, determine the tone t1 that is $$\text{argmax} \|y(t)\|^2 - \|y(t)-S1(s)-I3(s)\|^2 \text{ if } t1=t2=t \|y(t1)\|^2 - \|y(t1)-S1(s)\|^2 + \|y(t2)\|^2 - \|y(t2)-I3(s)\|^2 \text{ o/w}$$

t1=1, . . . 64
t2=1, . . . 64

A good choice for the pseudo-random variation theta1(s) is that it is independent across segments and uniform between 0 and 2*pi for each segment.

Scheme 3:

Scheme 3 is very similar to scheme 2, but both power and phase change pseudo-randomly with the segment. That is, the first device WT A sends the high energy tone at a power (P1(s)) and phase (theta1(s)) that are changing pseudo-randomly with segment s. Thus, the signal received for the high energy tone at the second device WT B for segment s is S1(s)=sqrt(P1(s))*exp(j*theta1(s)). Similarly I3(s) be the interference that the second device WT B receives from the third device WT C. The complex numbers S1(s) and I3(s) are known to the second device WT B for each segment which can be done, for example, through the pilot control channel/link scheduling or a combination of both. The second device WT B then uses S1(s) and I3(s) to determine the high energy tone that was sent by the first device WT A. The idea is that the received signal should be have high energy, and be closer to S1(s), but not close to I3(s). The canonical rules that the second device WT B uses are the same as that of scheme 2.

A good choice for the pseudo-random variation theta1(s) is that it is independent across segments and uniform between 0 and 2*pi for each segment, and a good rule for the pseudo-random variation P1(s) is that the lowest value that it takes be lower bounded by 10 db over interference. This is so that the tone does not get confused with the background Gaussian interference.

A flash signaling receiver first estimates the phase rotation from its intended transmitter in the rate scheduling phase of the protocol and then uses the estimated phase rotation in addition to received power level to determine the set of tone-symbols (degrees of freedom) used by its Flash transmitter in the data transmission segment.

A flash signaling transmitter first determines a subset of tone-symbols (or degrees of freedom) in the data transmission block based on the codeword to be transmitted. The information is coded by the position of these tone-symbols.

In addition, the transmitter may apply phase rotation pattern to the signals to be transmitted over the chosen tone-symbols where said phase rotation pattern is a based on the identity of the transmitter, which is known by its receiver.

Figure 8:
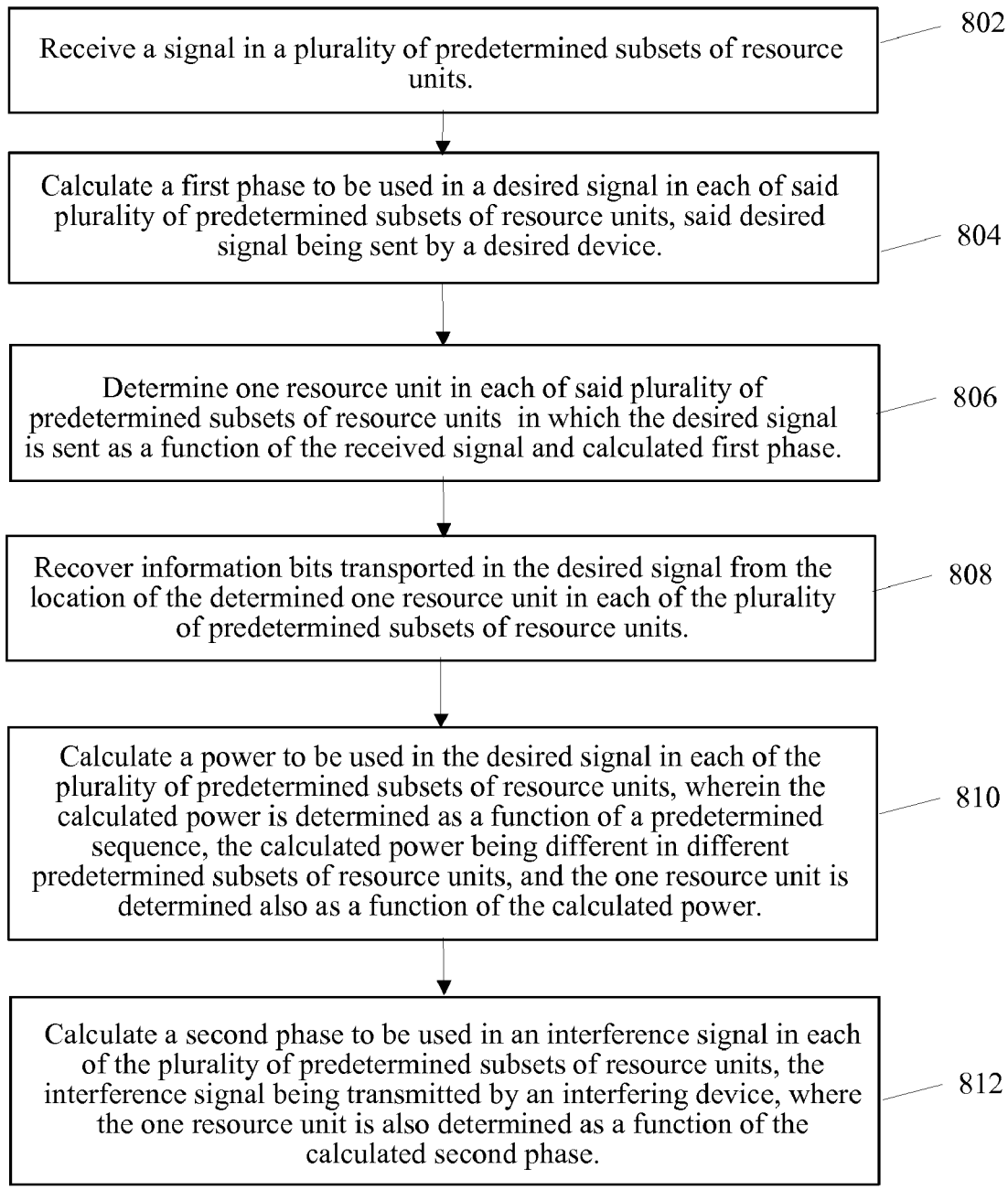
FIG. 8 illustrates a method operational at a second device having a peer-to-peer connection with a first device to facilitate interference management of small packet transmissions using flash signaling within an ad hoc wireless network.

FIG. 8 illustrates a method operational at a second device having a peer-to-peer connection with a first device to facilitate interference management of small packet transmissions using flash signaling within an ad hoc wireless network. The second device receives a signal in a plurality of predetermined subsets of resource units 802. Calculate a first phase to be used in a desired signal in each of the plurality of predetermined subsets of resource units, the desired signal being sent by a desired device 804. Note that the calculation of the first phase is not based on the received signal but based on the expected format of the desired signal. The expected format may be determined by the identifiers of the connection, the transmitter and/or receiver. Determine one resource unit in each of the plurality of predetermined subsets of resource units in which the desired signal is sent as a function of the received signal and calculated first phase 806. To do so, the second device may use the rules described in the above.

The second device may further recover information bits transported in the desired signal from the location of the determined one resource unit in each of the plurality of predetermined subsets of resource units 808. The calculated first phase may be the same in each of the plurality of predetermined subsets of resource units and is generated from at least one of a first identifier associated with the first device, a second identifier associated with the second device and the peer-to-peer connection between the first and second devices. The calculated first phase may be determined as a function of a predetermined sequence, the calculated first phase being different in different ones of the predetermined subsets of resource units. The predetermined sequence may be generated from at least one of a first identifier associated with the first device, a second identifier associated with the second device and the peer-to-peer connection between the first and second devices.

The second device may also calculate a power to be used in the desired signal in each of the plurality of predetermined subsets of resource units, wherein the calculated power is determined as a function of a predetermined sequence, where the calculated power is different in different predetermined subsets of resource units, and the one resource unit is also determined as a function of the calculated power 810. The second device may also calculate a second phase to be used in an interference signal in each of the plurality of predetermined subsets of resource units, the interference signal being transmitted by an interfering device, wherein the one resource unit is also determined as a function of the calculated second phase 812.

Figure 9:
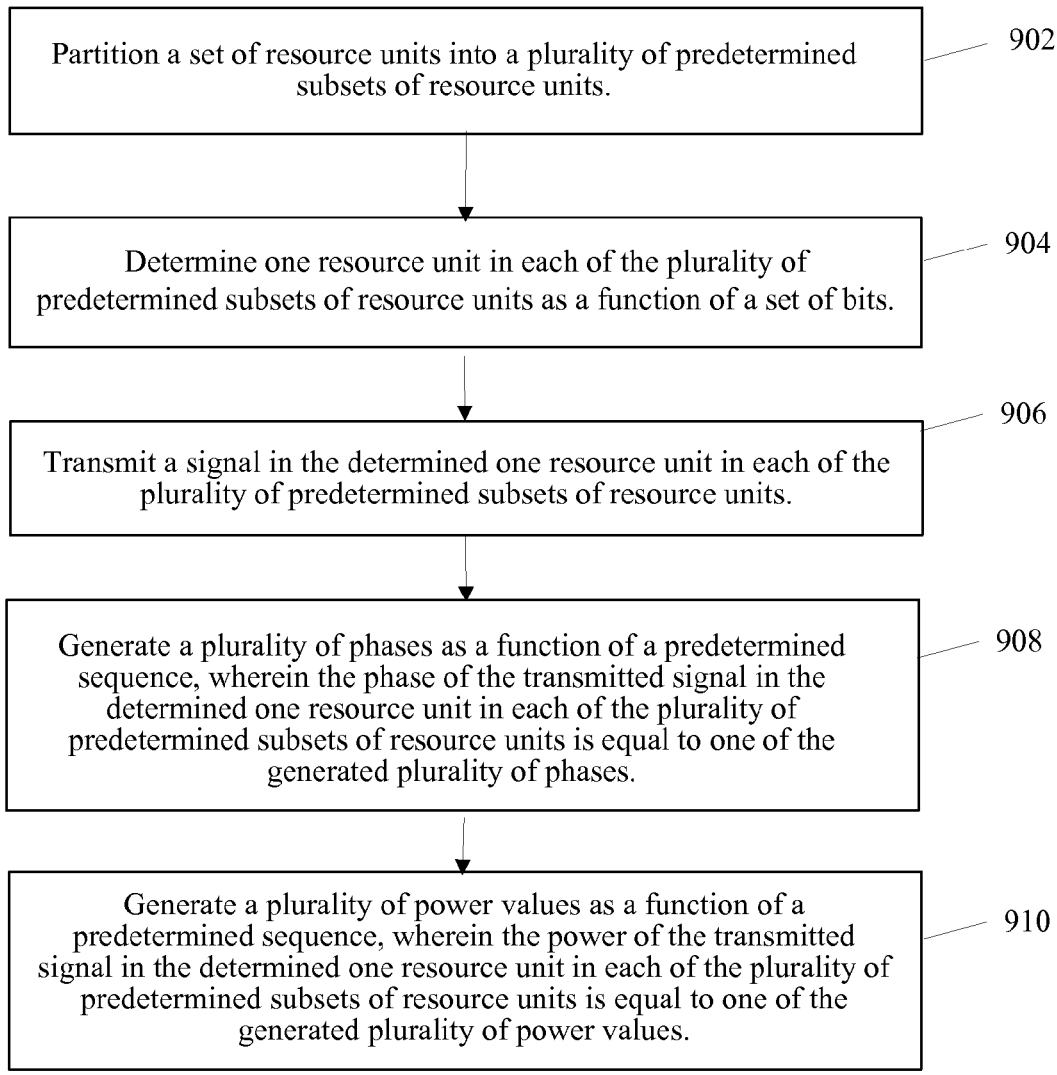
FIG. 9 illustrates a method operational at a first device having a peer-to-peer connection with a second device to facilitate interference management of small packet transmissions within an ad hoc wireless network.

FIG. 9 illustrates a method operational at a first device having a peer-to-peer connection with a second device to facilitate interference management of small packet transmissions within an ad hoc wireless network. The first device may partition a set of resource units into a plurality of predetermined subsets of resource units 902 and then determines one resource unit in each of the plurality of predetermined subsets of resource units as a function of a set of bits 904. In an example described previously, the set of resource units are partitioned into 100 subsets, each of which having 64 resource units. Then for each subset, the first device determines one of the 64 resource units to send a signal, and the choice depends on the 6 bits to be signaled in the subset. So totally 600 bits can be signaled using the 100 subsets. The set of 600 bits may be generated from a set of information bits with an encoder. A signal is then transmitted by the first device in the determined one resource unit in each of the plurality of predetermined subsets of resource units 906. The phase of the transmitted signal in the determined one resource unit is the same in each of the plurality of predetermined subsets of resource units and is generated from at least one of a first identifier associated with the first device, a second identifier associated with the second device and the peer-to-peer connection between the first and second devices.

The first device may further generate a plurality of phases as a function of a predetermined sequence, where the phase of the transmitted signal in the determined one resource unit in each of the plurality of predetermined subsets of resource units is equal to one of the generated plurality of phases 908. The predetermined sequence may be generated from at least one of a first identifier associated with the first device, a second identifier associated with the second device and the peer-to-peer connection between the first and second devices.

The first device may also generates a plurality of power values as a function of a predetermined sequence, wherein the power of the transmitted signal in the determined one resource unit in each of the plurality of predetermined subsets of resource units is equal to one of the generated plurality of power values 910.

Use Low Power in Traffic for Small Packet Transmission and Normal Power in Connection Scheduling: (From a Transmitter's Perspective)

Under typical operation, a transmission request may have a first transmit power which is indicative of the transmit power of a subsequent traffic signal. For example, the power used for the transmission request signal may be the same power as is subsequently used to transmit a traffic signal in a corresponding traffic slot. However, for small packet transmissions, a transmitter first device WT A may use the first power for the transmission request to a second device WT B but utilizes a lower second power for the small packet traffic transmissions.

It should be pointed out that because the transmitter first device may not have much flexibility to adjust the coding rate used in the transmission request signal, the transmission power in the request signal may not be reduced proportionally if it is determined that the traffic transmission power is to be reduced. Otherwise, the transmission request signal would be less reliable.

According to one feature, a transmitter first device may determine the transmission power to send traffic data in a current traffic slot when the transmission request signal is sent so that other neighboring devices in the peer-to-peer network can use the measurement from the transmission request signal in order to properly predict and manage the interference in the traffic slot. The transmitter first device may determine a power ratio between the traffic signal and the transmission request signal, and further broadcasts the determined power ratio, e.g., in the transmission request signal. In one example, the power ratio may be one of two predetermined values. The transmitter first device may choose one of the two values, and broadcasts the choice in the transmission request signal (e.g., using 1 bit). The transmission power used in the transmission request signal remains the same. When a different power ratio is used, the traffic transmission power is in effect changed. For example, when the transmitter terminal does not have much data traffic to send in the traffic data block (i.e., a small packet mode), it chooses a power ratio so that the traffic transmission power is much smaller than when the transmitter terminal does have much data traffic to send (i.e., a normal packet mode). In one example, the difference between the two power ratios is at least 10 dB. In other words, the power ratio can be one of a predetermined set of discrete values. In yet another example, the power ratio can be any value between the predetermined minimum and maximum values, in which case the possible value of the power ratio is not discrete but continuous.

When the receiver second device recovers the specific power ratio to be used from the received request signal, the receiver second device predicts the received power of traffic transmission from the power ratio and the measured power of the received transmission request signal. The receiver second device then predicts the signal-to-interference ratio of the traffic transmission to determine whether it is ready to receive traffic transmission from the transmitter first device. If so, the receiver second device sends a request response signal to inform the transmitter first device. The transmission power of the request response signal is determined as a function of the received power of the transmission request signal. For example, the transmission power of the request response signal is inversely proportional to the received power of the transmission request signal.

In accordance with one aspect, the power of the request response signal may be independent of the power ratio. In other words, even if the receiver second device notices from the received power ratio information in the request signal that the transmitter first device is going to reduce the traffic transmission power, the receiver second device does not increase or decrease the transmission power of the request response signal.

In one example, a first device WT A sends a first transmission request signal with a first power level to a second device WT B in a first transmission request resource associated with a first traffic slot. The transmission request signal may include a first packet length information for a first packet to be transmitted in the current traffic slot. The first device WT A then sends a first traffic signal including the first packet over the first traffic slot with a second power level. The first device may also send a second transmission request signal with the first power level to the second device in a second transmission request resource associated with a second traffic slot. The second transmission request signal including a second packet length information, where the second packet length information is different from first packet length information. The first device then sends a second data transmission signal over the second data transmission resource with a third power level, where the third power level is at least 3 dB smaller than the first power level.

There may instances where the transmitter first device may wish to adjust its announced power ratio of transmission requests signal power to traffic signal power. In one example, the transmitter first device may want to reduce the transmission power of the traffic slot, so that it causes less interference to other high priority traffic transmission. This way, the transmitter first device may not have to perform transmitter yielding to favor other higher priority traffic transmissions. In another example, if the transmitter first device may not have much data to send, and using large transmission power in the current traffic slot is wasteful. In the above examples, it is desired that the transmitter first device reduces the traffic transmission power. For example, suppose that the transmitter first device transmits the traffic signal in the entire traffic slot. When the transmitter first device reduces the transmission power, although the transmission power per degree of freedom (e.g., per tone in an OFDM symbol) is reduced, the transmitter first device can use a low coding rate to compensate the reduced SNR per degree of freedom and therefore maintain the proper Eb/N0 requirement. In effect, the transmitter first device adjusts the coding rate, and therefore the amount of data to be transported in the traffic slot, in order to accommodate the reduction in transmission power.

Figure 10A:
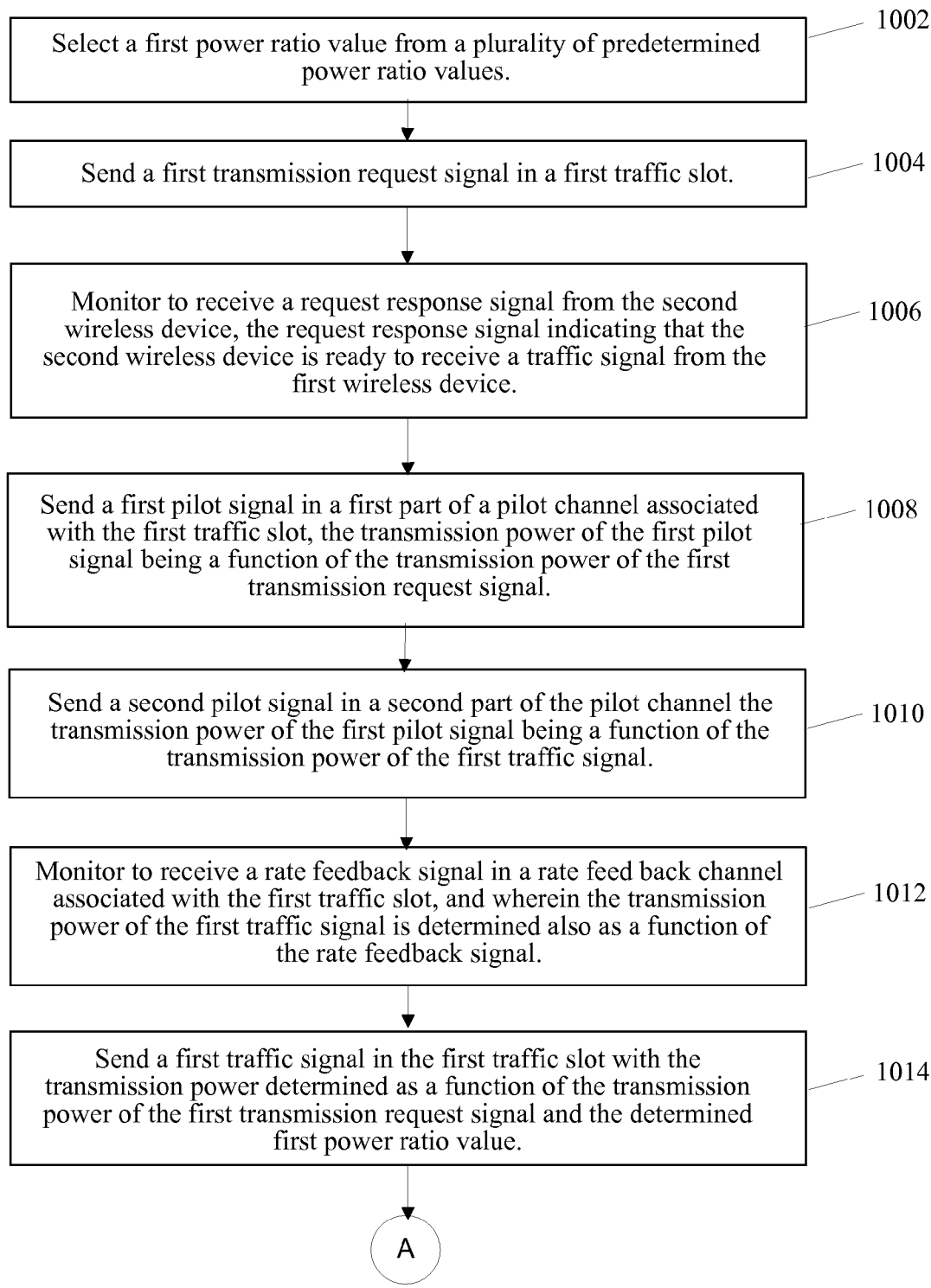
FIG. 10 (comprising FIGS. 10A and 10B) illustrates a method of operating a first wireless device in a peer-to-peer communication network.
Figure 10B:
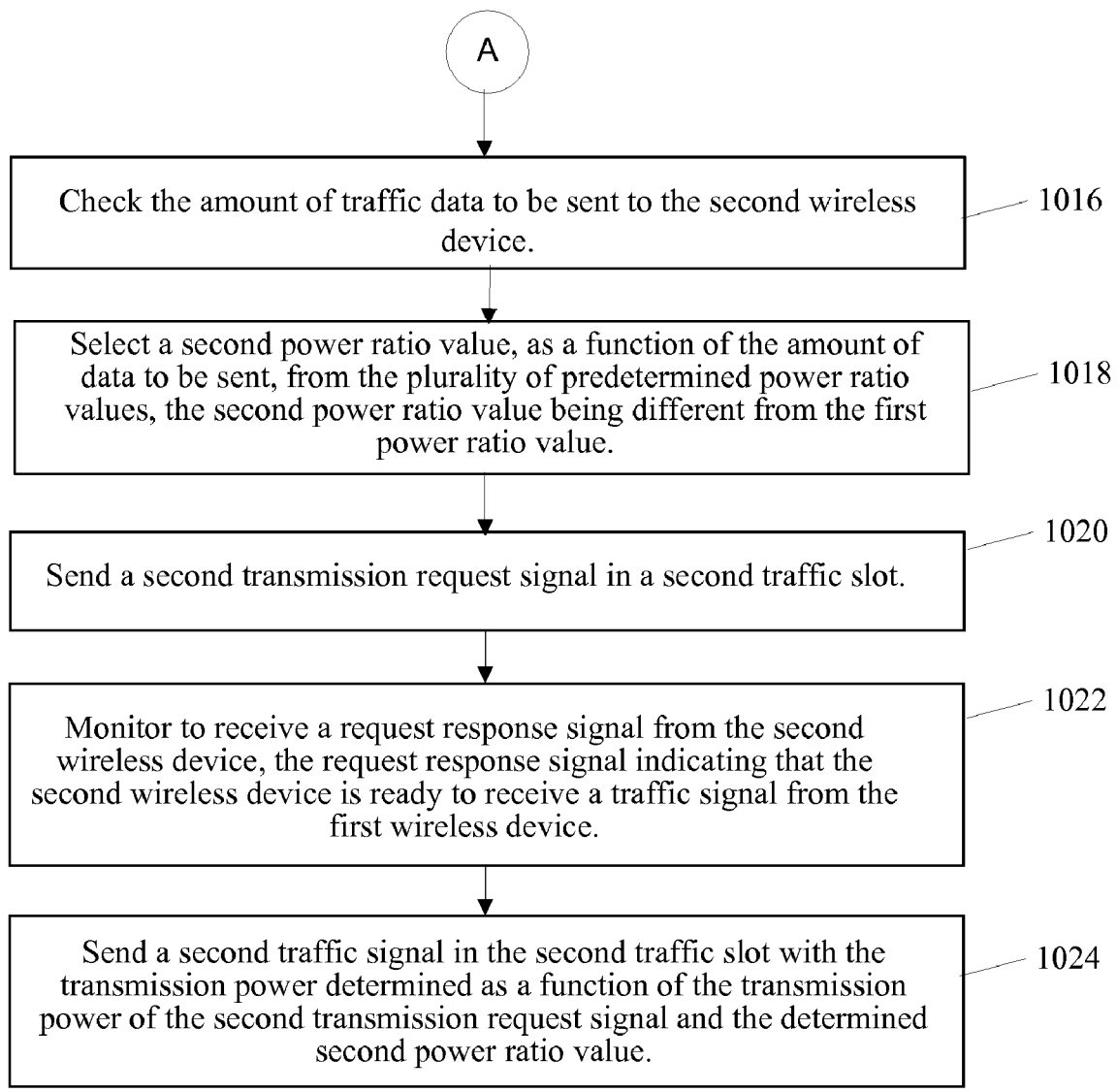

FIG. 10 (comprising FIGS. 10A and 10B) illustrates a method of operating a first wireless device in a peer-to-peer communication network. The first wireless device having a connection with a second wireless device. The first device may select a first power ratio value from a plurality of predetermined power ratio values 1002. A first transmission request signal is sent by the first device in a first traffic slot 1004. The first device then monitors (e.g., the first traffic slot) to receive a request response signal from the second wireless device, the request response signal indicating that the second wireless device is ready to receive a traffic signal from the first wireless device 1006. If the request response signal is received, the first device may send a first traffic signal in the first traffic slot with the transmission power determined as a function of the transmission power of the first transmission request signal and the determined first power ratio value 1014. Prior to sending the first traffic signal, the first device may send a first pilot signal in a first part of a pilot channel associated with the first traffic slot, where the transmission power of the first pilot signal being a function of the transmission power of the first transmission request signal 1008. Similarly, the first device may send a second pilot signal in a second part of the pilot channel the transmission power of the first pilot signal being a function of the transmission power of the first traffic signal 1010. The first device then monitors (e.g., the current traffic slot) to receive a rate feedback signal in a rate feed back channel associated with the first traffic slot, and wherein the transmission power of the first traffic signal is determined also as a function of the rate feedback signal 1012.

The ratio of the power of the first traffic signal and the power of the first transmission request signal may be equal to the determined first power ratio value. The first transmission request signal may include information (e.g., such as a rate bit) indicative of the determined first power ratio value. In one example, the first power ratio value is selected from two predetermined power ratio values, where the difference between the two predetermined power ratio values is at least 10 dB. The first power ratio value may be determined as a function of the amount of data to be sent in the first traffic signal. According to one aspect, the first request signal may be sent in two tones and the information indicative of the determined first power ratio value is signaled in a phase difference between the two tones. In one instance, the plurality of predetermined power ratio values may include values in a continuous interval between two predetermined values.

Subsequently, the first device may also check an amount of traffic data to be sent to the second wireless device 1016. A second power ratio value may be selected by the first device, as a function of the amount of data to be sent, from the plurality of predetermined power ratio values, where the second power ratio value is different from the first power ratio value 1018. A second transmission request signal is then sent in a second traffic slot 1020. The first device may then monitor to receive a request response signal from the second wireless device, where the request response signal indicates that the second wireless device is ready to receive a traffic signal from the first wireless device 1022. If the request response signal is received, the first device sends a second traffic signal in the second traffic slot with the transmission power determined as a function of the transmission power of the second transmission request signal and the determined second power ratio value 1024. The amount of data to be sent in the second traffic slot may be at least twice as much as the amount of data sent in the first traffic slot and the second power ratio is at least 10 dB greater than the first power ratio. The transmission power of the second request signal may be the same as the transmission power used in the first request signal.

Figure 11:
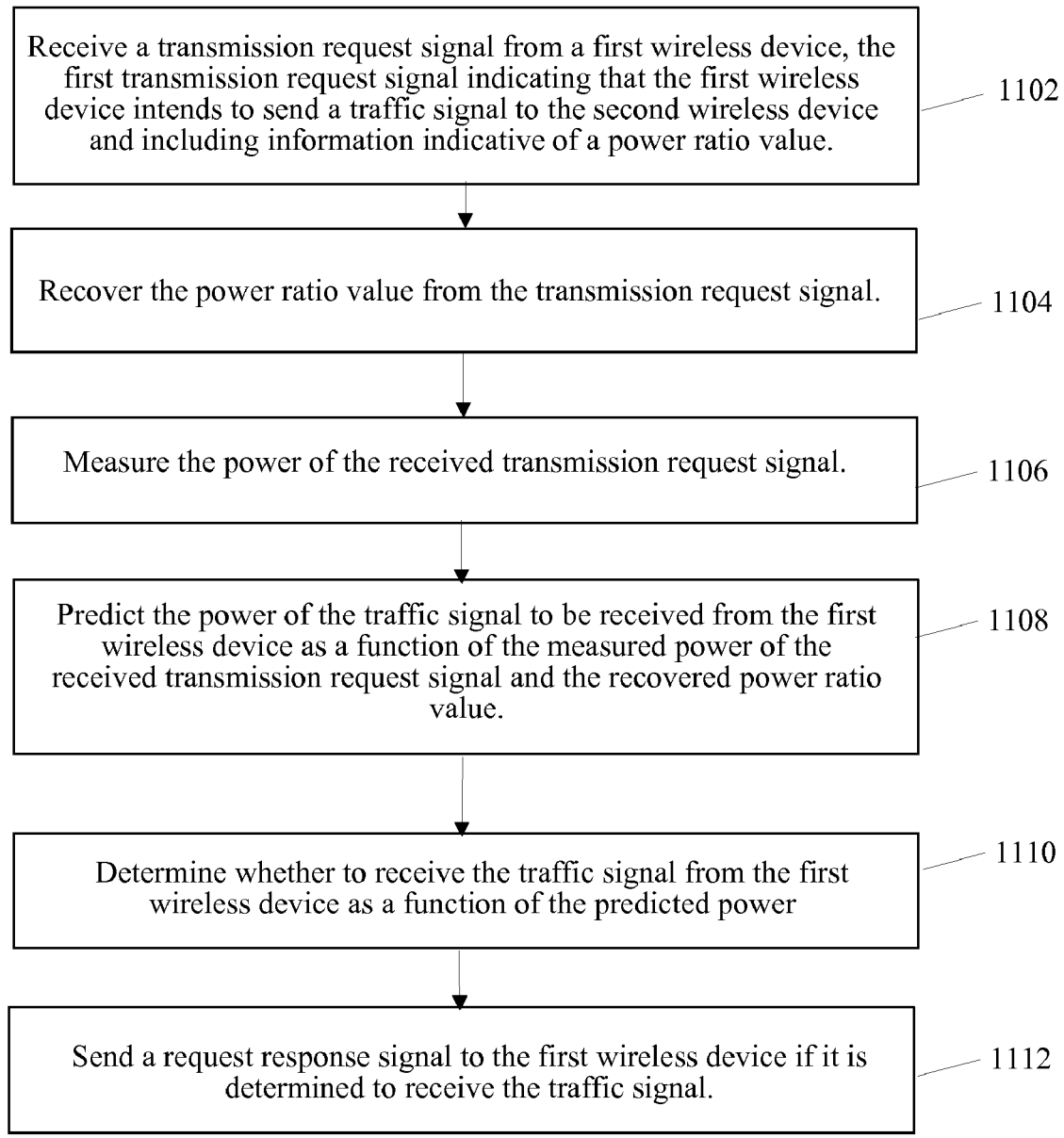
FIG. 11 illustrates a method of operating a second wireless device in a peer to peer communication network.

FIG. 11 illustrates a method of operating a second wireless device in a peer to peer communication network. The second wireless device having a connection with a first wireless device. In this example, the second device may be a target of traffic transmissions from the first device over a peer-to-peer connection. A transmission request signal is received from the first wireless device, the first transmission request signal indicating that the first wireless device intends to send a traffic signal to the second wireless device and including information indicative of a power ratio value 1102. The second device may recover the power ratio value from the transmission request signal 1104. The power of the received transmission request signal may then be measured by the second device 1106. The power of the traffic signal to be received from the first wireless device may be predicted by the second device as a function of the measured power of the received transmission request signal and the recovered power ratio value 1108. The second device may then determine whether to receive the traffic signal from the first wireless device as a function of the predicted power 1110. The second device then sends a request response signal to the first wireless device if it is determined to receive the traffic signal 1112. The predicted power may be equal to the measured power of the received transmission request signal multiplied by the recovered power ratio value. The transmission power of the request response signal may be determined as a function of the measured power of the received transmission request signal and may be independent of the recovered power ratio value.

Figure 12:
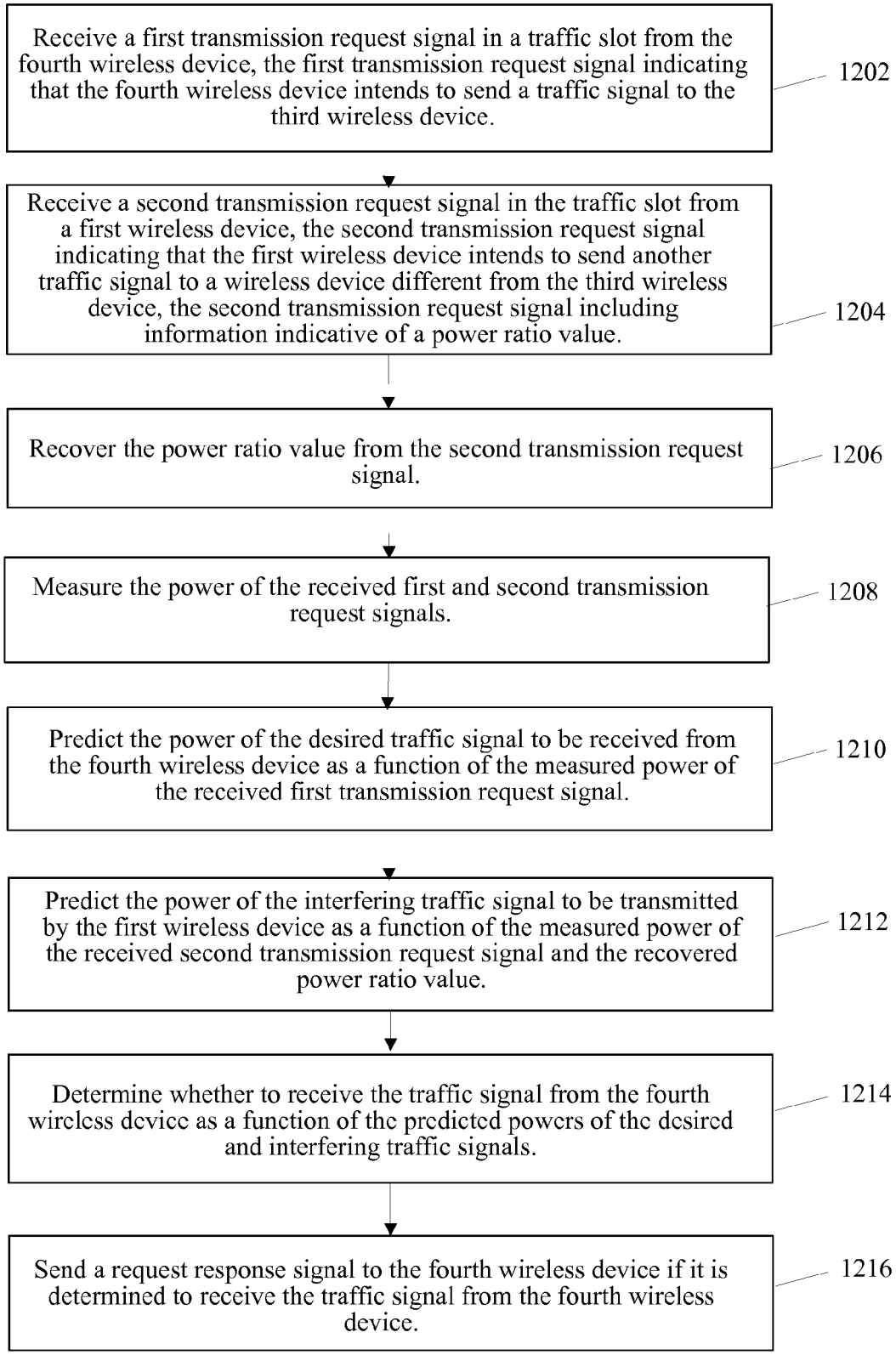
FIG. 12 illustrates a method of operating a third wireless device in a peer to peer communication network.

FIG. 12 illustrates a method of operating a third wireless device in a peer to peer communication network. The third wireless device may have a peer-to-peer connection with a fourth wireless device. In this example, the third device is considered the interferer of peer-to-peer communications between a first and second device having higher priority. The third device may receive a first transmission request signal in a traffic slot from the fourth wireless device, the first transmission request signal indicating that the fourth wireless device intends to send a traffic signal to the third wireless device 1202. The third device receives a second transmission request signal in the traffic slot from a first wireless device, the second transmission request signal indicating that the first wireless device intends to send another traffic signal to a second wireless device different from the third wireless device, the second transmission request signal including information indicative of a power ratio value 1204. The power ratio value may be recovered by the third device from the second transmission request signal 1206. The power of the received first and second transmission request signals may be measured by the third device 1208. The power of the desired traffic signal to be received from the fourth wireless device may be predicted by the third device as a function of the measured power of the received first transmission request signal 1210. Similarly, the power of the interfering traffic signal to be transmitted by the first wireless device may be predicted by the third device as a function of the measured power of the received second transmission request signal and the recovered power ratio value 1212. The third device may then determine whether to receive the traffic signal from the fourth wireless device as a function of the predicted powers of the desired and interfering traffic signals 1214. If the third device determines that it can receive the traffic signal from the fourth wireless device it may send a request response signal to the fourth wireless device 1216. The predicted power of the interfering traffic signal may be equal to the measured power of the received second transmission request signal multiplied by the recovered power ratio value. The decision of whether to receive the traffic signal from the fourth wireless device may be determined as a function of ratio between the predicted powers of the desired and interfering traffic signals.

Method of Using Flash Signaling to Allow Low-Priority Transmitter to not Transmit Yield to High-Priority Traffic According to another example, devices within a peer-to-peer network may undertake yielding decisions based on packet length information ascertainable from pilot signals. A first device WT A may wish to transmit a small packet to a second device WT B via a first peer-to-peer connection while a third device WT C may wish to transmit a normal packet to a fourth device WT D.

Again consider the baseline interference management protocol discussed in FIGS. 2, 3, 5, and 6. A traffic slot consists of a traffic management (or traffic control) channel portion and a traffic channel portion. The traffic channel portion is used to send actual data traffic, while the traffic control channel portion is used by the terminals for managing interference among them. Consider the scenario where a first terminal WT-A intends to send traffic to a second terminal WT-B and a third terminal WT-C intends to send traffic to fourth terminal WT-D. Further assume that traffic transmissions from the first to second terminals is of higher priority than traffic transmissions from the third to fourth terminals traffic so the third terminal WT C (low-priority transmitter) has to make sure the interference it would generate to the second terminal WT-B (high-priority receiver) is acceptable, otherwise, the third terminal WT-C has to restrain (i.e., transmit yield) from sending the traffic to the fourth terminal WT-D in the present traffic slot.

In order to make transmit yielding decision, the third terminal WT-C estimates the "interference cost" to the second terminal WT-B. The "interference cost" is a function of the transmission power that the third terminal WT-C intends to use to send the traffic to the fourth terminal WT-D. The third terminal WT-C may reduce its transmission power to reduce the interference cost so that it does not need to yield to the traffic from first to the second terminals WT-A and WT-B.

According to one feature, the "interference cost" may also be a function of the signaling format. Two signaling formats are considered. The first signaling format is a Gaussian signaling format, in which the signal occupies all the degrees of freedom. The second signaling format is a non-Gaussian signaling format, referred to as a "flash signaling" format, in which the signal occupies a small fraction, e.g., 10%, of the total degrees of freedom. For example, consider the scenario where the traffic channel portion includes a number of OFDM symbols, each OFDM symbol including a number of tones. With the Gaussian signaling format, the signal is transmitted in all the tones of all the OFDM symbols. For example, the transmitter terminal may transmit a complex symbol, e.g., QPSK symbol, in every tone of every OFDM symbol. On the other hand, with the flash signaling format, the signal is transmitted in a small fraction of tones in some OFDM symbols. For example, the signal may be transmitted in only one tone in every OFDM symbol.

The interference cost calculated by third terminal WT C may depend on whether the Gaussian or flash signaling format is to be used for the traffic from the third to the fourth terminals. In particular, the interference cost is lower when flash signaling format is used. In other words, assuming everything else equal, using flash signaling format, the third terminal WT-C will need to yield less often. In one embodiment, the third terminal WT-C monitors (a traffic management channel) to determine the number of other high-priority connections that are going to use flash signaling format in the traffic channel of the present traffic slot. If the number is large, e.g., greater than three, the third terminal WT-C may decide to yield (i.e., not transmit its traffic in the current traffic slot).

Figure 13A:
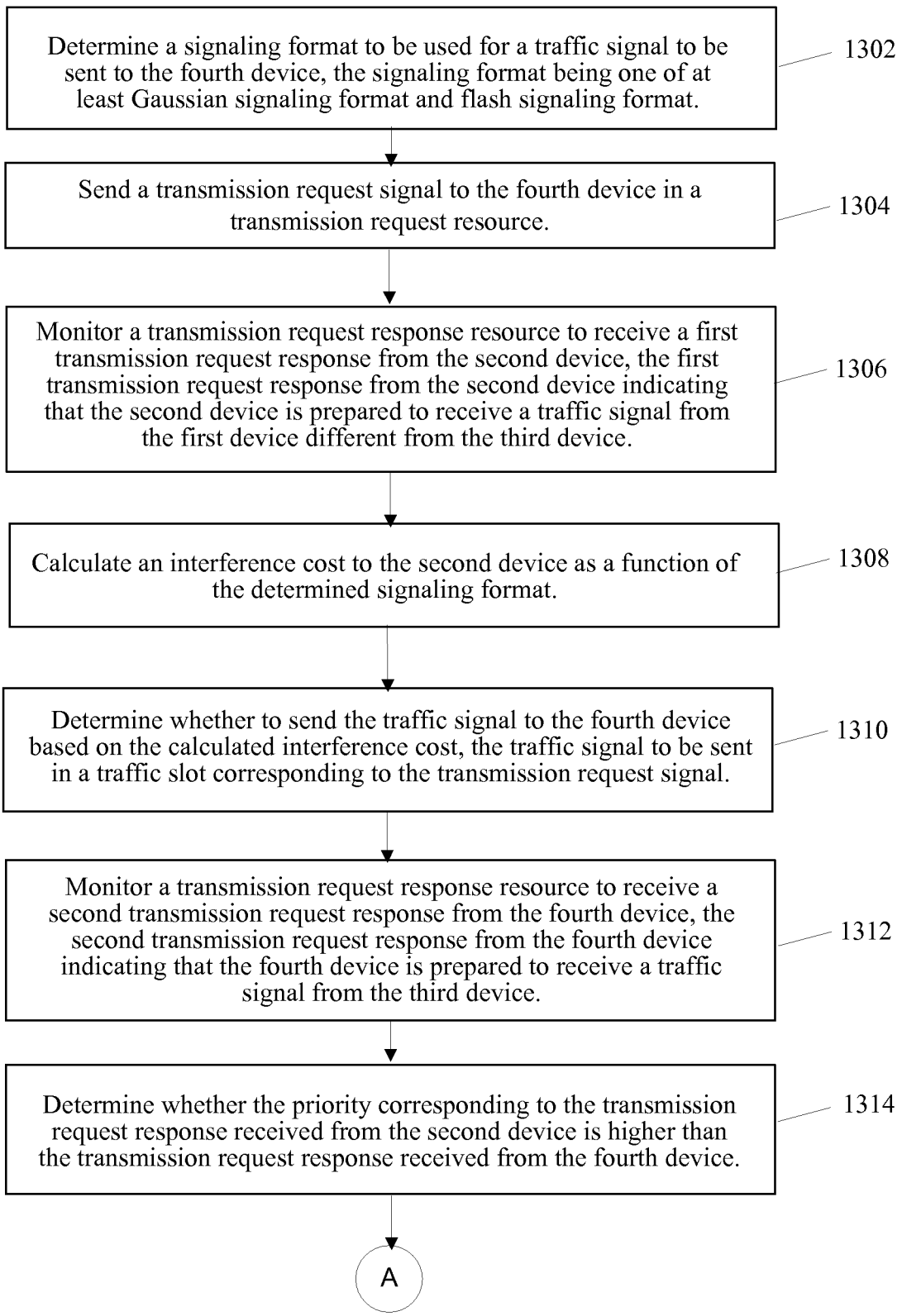
FIG. 13 (comprising FIGS. 13A and 13B) illustrates a method operational in a third device having a peer-to-peer connection with a fourth device to facilitate interference management for a second peer-to-peer connection between a first device and a second device within a wireless network.
Figure 13B:
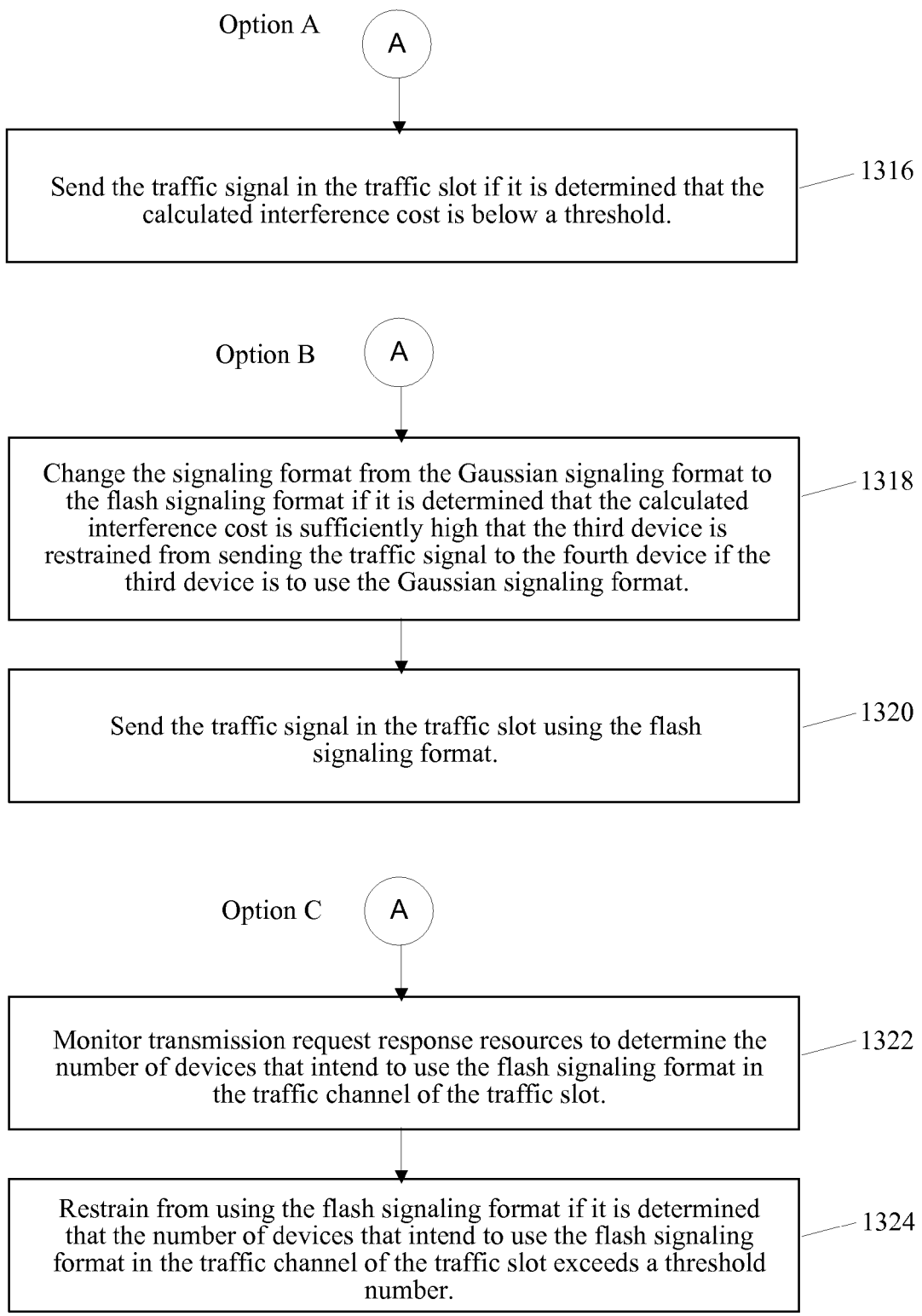

FIG. 13 (comprising FIGS. 13A and 13B) illustrates a method operational in a third device having a peer-to-peer connection with a fourth device to facilitate interference management for a second peer-to-peer connection between a first device and a second device within a wireless network. The third device may determine a signaling format to be used for a traffic signal to be sent to the fourth device, the signaling format being one of at least Gaussian signaling format and flash signaling format 1302. A transmission request signal is sent by the third device to the fourth device in a transmission request resource 1304. The third device monitors a transmission request response resource to receive a first transmission request response from the second device, the transmission request response from the second device indicating that the second device is prepared to receive a traffic signal from the first device different from the third device 1306. An interference cost to the second device may be calculated by the third device as a function of the determined signaling format 1308. The third device can then determine whether to send the traffic signal to the fourth device based on the calculated interference cost, the traffic signal to be sent in a traffic slot corresponding to the transmission request signal 1310. The third device may monitor a transmission request response resource to receive a second transmission request response from the fourth device, the second transmission request response from the fourth device indicating that the fourth device is prepared to receive a traffic signal from the third device 1312. The third device can then determine whether the priority corresponding to the first transmission request response received from the second device is higher than the second transmission request response received from the fourth device 1314.

According to one alternative, the third device may then send the traffic signal in the traffic slot if it is determined that the calculated interference cost is below a threshold 1316. The value of calculated interference cost is smaller if it is determined that a flash signaling format is to be used rather than if it is determined that a Gaussian signaling format is to be used. The traffic signal is sent in a fraction of the traffic channel resource in the traffic slot if it is determined the flash signaling format is to be used. The fraction may be less than twenty percent of the traffic channel.

According to one feature, the transmission request signal may include information indicative of the signaling format to be used in the traffic signal. The transmission request signal may be sent using a plurality of tones and information indicative of the signaling format to be used in the traffic signal is sent using the phases of the plurality of tones. The number of information bits to be sent in the traffic signal when the Gaussian signaling format is used may be at least twice as many as the number of information bits to be sent in the traffic signal when the flash signaling format is used.

According to another alternative, the third device may change the signaling format from the Gaussian signaling format to the flash signaling format if it is determined that the calculated interference cost is sufficiently high that the third device is restrained from sending the traffic signal to the fourth device if the third device is to use the Gaussian signaling format 1318. The third device may then send the traffic signal in the traffic slot using the flash signaling format 1320.

According to another alternative, the third device may monitor transmission request response resources to determine the number of devices that intend to use the flash signaling format in the traffic channel of the traffic slot 1322. The third device may then restraining from using the flash signaling format if it is determined that the number of devices that intend to use the flash signaling format in the traffic channel of the traffic slot exceeds a threshold number 1324.

Method of Using Flash Signaling to Allow Low-Priority Receiver to not Receive Yield to High-Priority Traffic According to another scenario, a first terminal WT-A intends to send traffic to a second terminal WT-B and a third terminal WT-C intends to send traffic to fourth terminal WT-D. This example, assumes that the traffic from the first terminal to the second terminal is of higher priority than traffic from the third terminal to the fourth terminal. Therefore, the fourth terminal (low-priority receiver) has to make sure the interference from first terminal (high-priority transmitter) is acceptable; otherwise, the fourth terminal does not respond to the transmission request from third terminal WT-C so that third terminal WT-C will not send the traffic to the fourth terminal WT-D in the current traffic slot, i.e., perform receiver yielding.

In order to make a receiver yielding decision, the fourth terminal WT-D estimates the "signal to interference ratio" where the signal power is associated with the signal to be sent by the third terminal WT-C and the interference power is associated with the signal to be sent by first terminal WT-A. The interference power may be obtained as a function of the received power of a transmission request that is sent by first terminal WT-A to the second terminal WT-B but received at fourth terminal WT-D. Moreover, the interference power is also a function of the signaling format, e.g., Gaussian versus flash signaling formats.

According to one feature, the interference power calculated by fourth terminal WT-D may depend on whether the Gaussian or flash signaling format is to be used for the traffic from the first terminal WT-A to the second terminal WT-B. In particular, the interference power may be lower when flash signaling format is used. In other words, assuming everything else equal, if the first terminal WT-A is going to use flash signaling format, the fourth terminal WT-D will need to yield less often. In one embodiment, the fourth terminal WT-D monitors to see the number of other high-priority connections that are going to use flash signaling format in the traffic channel of the current traffic slot. If the number is large, e.g., greater than three, the fourth terminal WT-D may decide to yield.

Figure 14A:
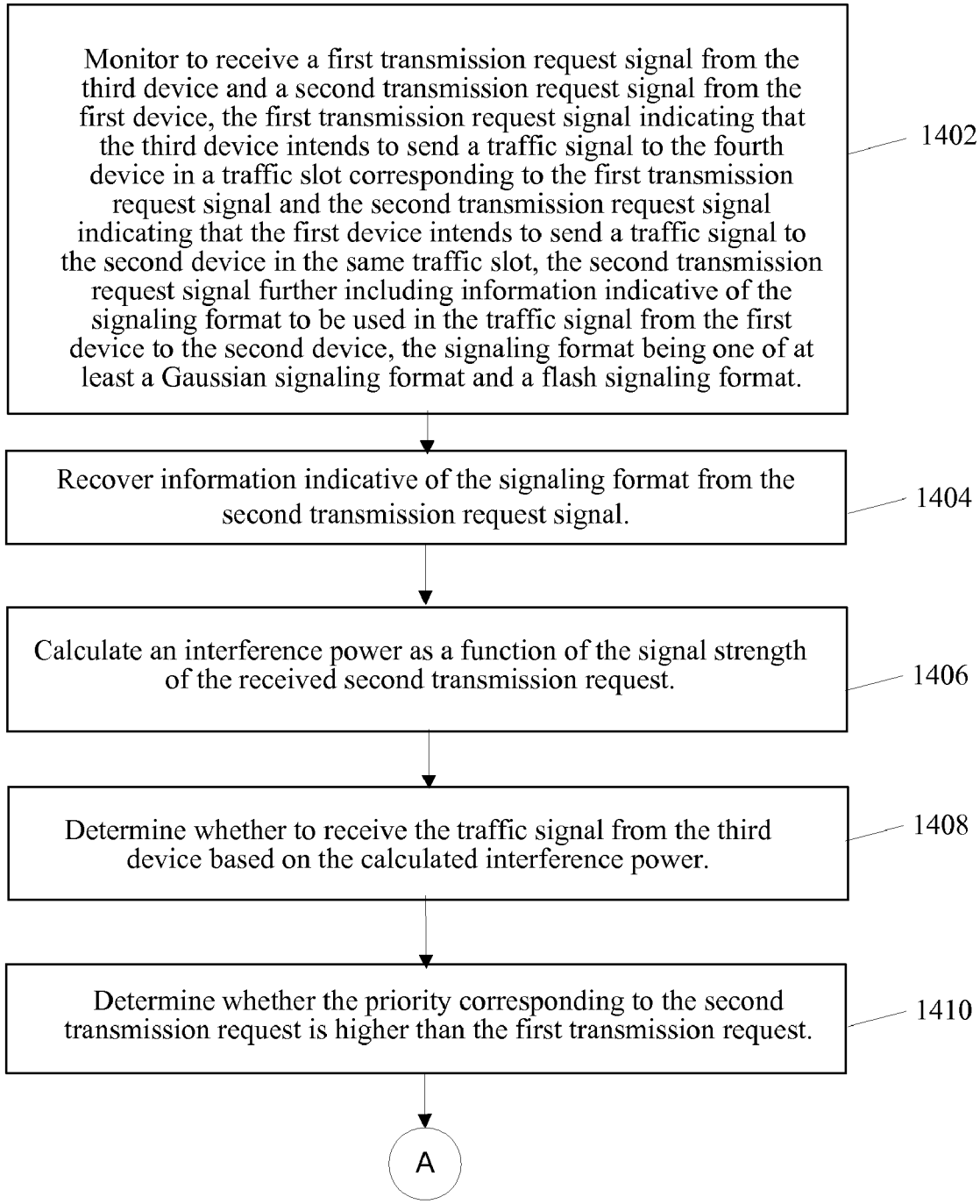
FIG. 14 (comprising FIGS. 14A and 14B) illustrates a method operational in a fourth device having a peer-to-peer connection with a third device to facilitate interference management for a second peer-to-peer connection between a first device and a second device within a wireless network.
Figure 14B:
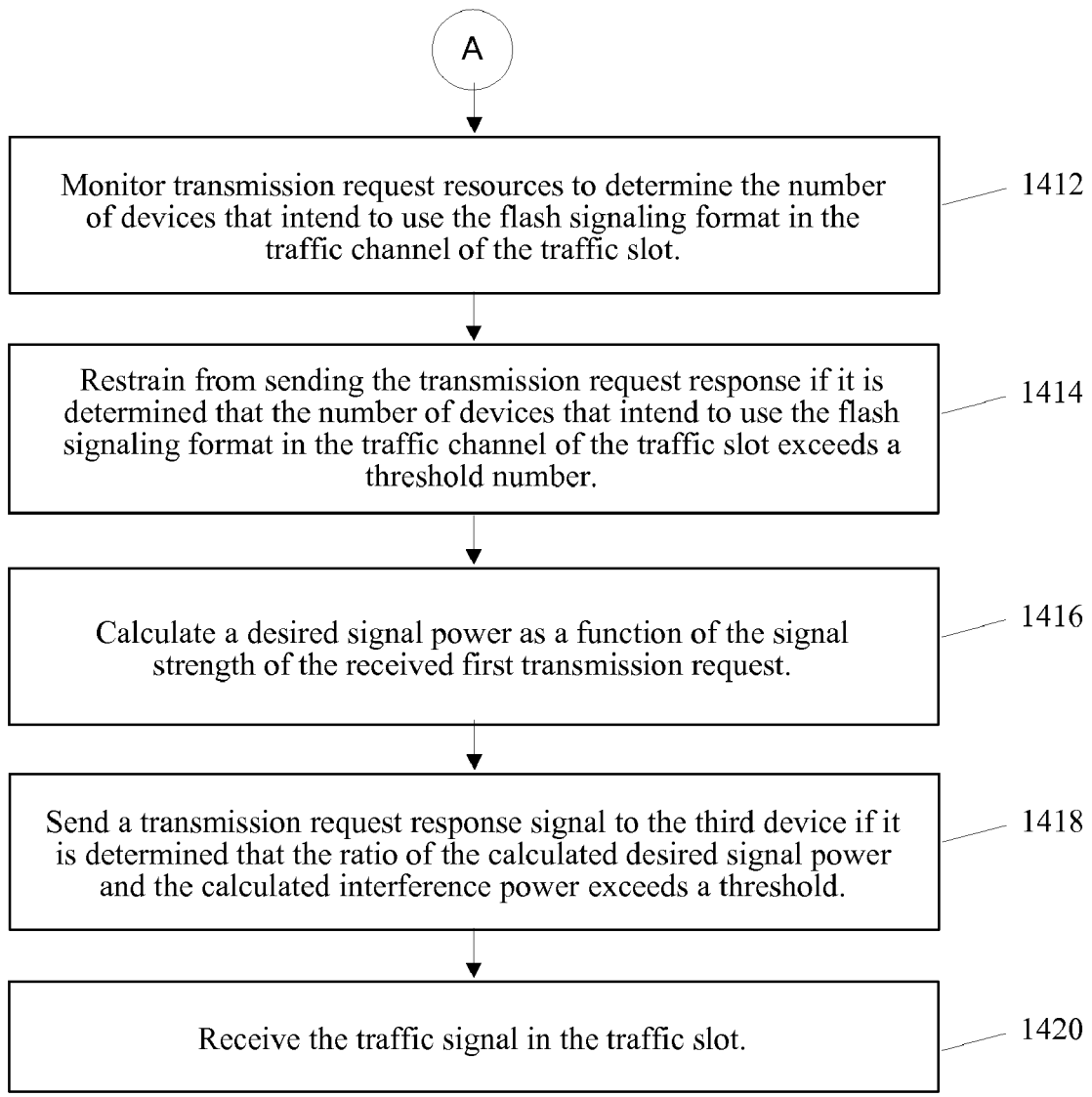

FIG. 14 (comprising FIGS. 14A and 14B) illustrates a method operational in a fourth device having a peer-to-peer connection with a third device to facilitate interference management for a second peer-to-peer connection between a first device and a second device within a wireless network. The fourth device may monitor to receive a first transmission request signal from the third device and a second transmission request signal from the first device, the first transmission request signal indicating that the third device intends to send a traffic signal to the fourth device in a traffic slot corresponding to the first transmission request signal and the second transmission request signal indicating that the first device intends to send a traffic signal to the second device in the same traffic slot, the second transmission request signal further including information indicative of the signaling format to be used in the traffic signal from the first device to the second device, the signaling format being one of at least a Gaussian signaling format and a flash signaling format 1402. The information indicative of the signaling format may be recovered by the fourth device from the second transmission request signal 1404. The fourth device may then calculate an interference power as a function of the signal strength of the received second transmission request 1406. The value of the calculated interference power may be determined as a function of the recovered signaling format.

The value of the calculated interference power is smaller if the flash signaling format is to be used than if the Gaussian signaling format is to be used. The traffic signal is to be sent by the first device in a fraction of the traffic channel resource in the traffic slot if the flash signaling format is to be used. The fraction may be less than twenty percent of the traffic channel. The second transmission request signal may be sent using a plurality of tones and the information indicative of the signaling format to be used in the traffic signal is sent using the phases of the plurality of tones.

The fourth device may then determine whether to receive the traffic signal from the third device based on the calculated interference power 1408. In making such determination, the fourth device may take a number of steps. For example, the fourth device may further determine whether the priority corresponding to the second transmission request is higher than the first transmission request 1410. The fourth device may also monitor transmission request resources to determine the number of devices that intend to use the flash signaling format in the traffic channel of the traffic slot. If the fourth device determines that the number of devices that intend to use the flash signaling format in the traffic channel of the traffic slot exceeds a threshold number, it may restrain from sending the transmission request response 1414.

The fourth device may also calculate a desired signal power as a function of the signal strength of the received first transmission request 1416. A transmission request response signal may be sent by the fourth device to the third device if it is determined that the ratio of the calculated desired signal power and the calculated interference power exceeds a threshold 1418. Subsequently, the fourth device may receive the traffic signal in the traffic slot 1420. The number of information bits to be sent in the traffic signal when the Gaussian signaling format is used are at least twice as many as the number of information bits to be sent in the traffic signal when the flash signaling format is used.

Channel Estimation (Pilot and CQI channel) Design with Flash Signaling

The typical rate scheduling algorithm is split into two stages or phases. In a first stage, the transmitter first device WT A sends a pilot signal over a pilot channel which is used by the receiver second device WT B for SINR estimation. The receiver then sends back quantized SINR value in a channel quality indicator (CQI) channel to the transmitter first device WT A so that the transmitter first device WT A can decide the rate format that should be used for the traffic data transmission.

The first device WT A transmits a packet using Gaussian signaling to the second device WT B and the third device WT C transmits a small packet to the fourth device WT D using non-Gaussian signaling or flash signaling.

There are two objectives for the rate scheduling stage. First, the fourth device WT D should be informed that the third device WT C has a small packet and is using non-Gaussian (flash) signaling. The second is that the SINR calculation done by the second device WT B should accurately take into account the fact the transmission from the third device WT C that acts as interference (to the transmission from the first device WT A) is using non-Gaussian signaling. This means that the if the traffic signal from the third device WT C is received at a high power at the second device WT B, then such interference will act as erasures, otherwise it will act as additive noise.

For this purpose, a hybrid rate signaling scheme is used for the pilot channel. The main idea is to mimic the signaling used for traffic data communications during the pilot channel. That is, the first device WT A which is using the usual Gaussian signaling for traffic communication, sends a pseudo-random noise (PN) sequence occupying the entire degrees of freedom used for the pilot channel, whereas the third device WT C which is using non-Gaussian signaling uses a proportionate number of high energy tones within the pilot channel.

One example may assume that the pilot channel consists of 128 complex degrees of freedom. Then, the first device WT A transmits at pseudo-random noise sequence of length 128, this sequence is known to the second device WT B. The third device WT C transmits a small number (2-4) of high energy tones. The tone locations may be picked pseudo-randomly and are known to the fourth device WT-D.

The second device WT B may first determine the set of high energy tones amongst received 128 tones. For example, this can be defined as tones that are at least 10 db higher than the average energy. Then, if this set of tones includes that set of tones that the first device WT A would have used if it had a small packet (which is known to the second device) then the second device WT B assumes that the first device WT A has a small packet to send, and sends back a default message (typically corresponding to the lowest rate option) back to the first device WT A during the CQI channel. Otherwise, the second device WT B discards these tones as erasures, and uses the remaining tones for SINR estimation. After calculating the SINR for the remaining tones, it accounts for the number of tones lost as erasures to calculate an effective (lower) SINR that is quantized and sent back to the first device WT A during the CQI channel. The fourth device WT-D behaves similar to the second device WT B.

Figure 15:
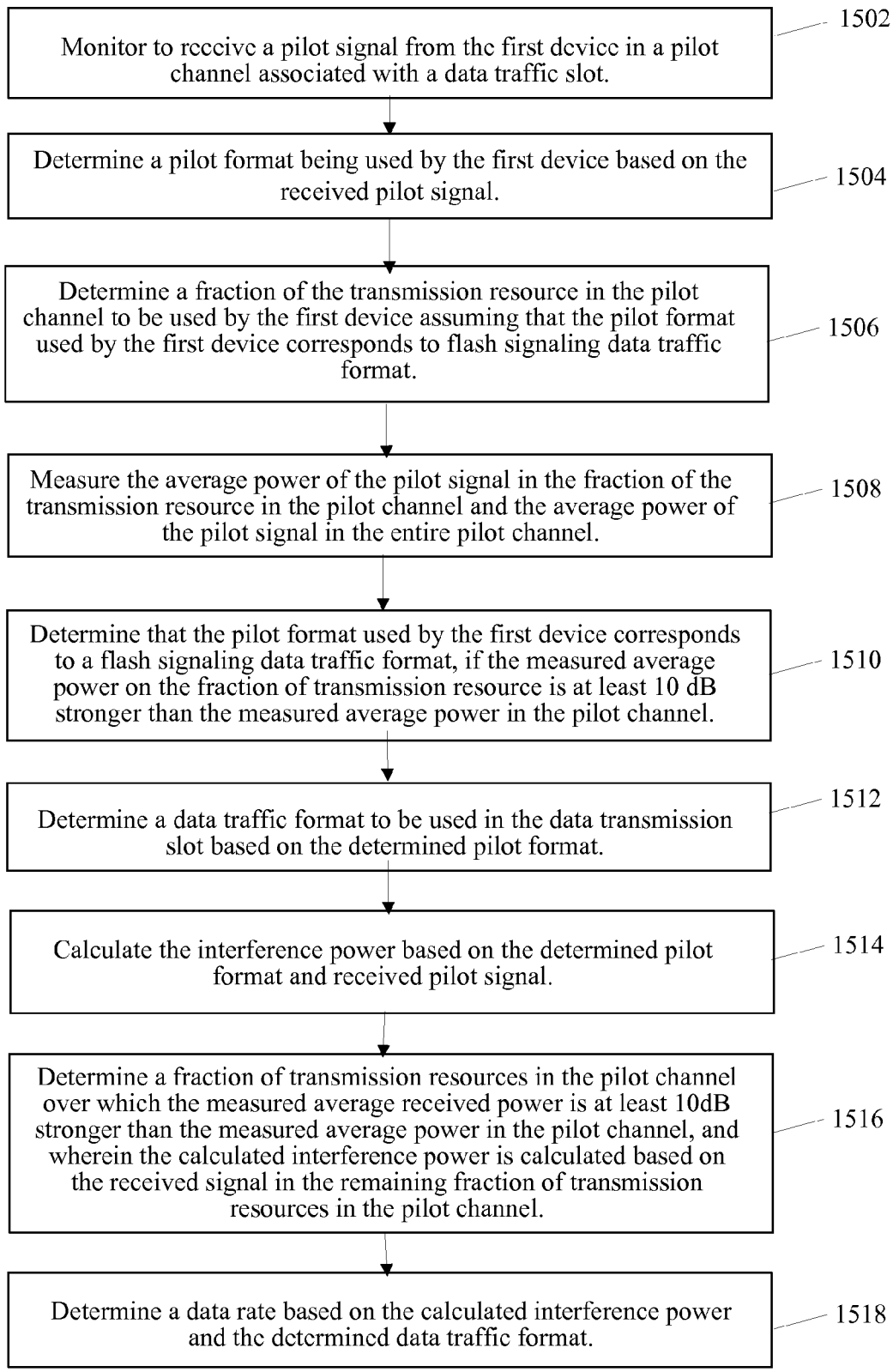
FIG. 15 illustrates a method of operating a second wireless device in a peer-to-peer communication network, the second wireless device having a connection with a transmitter first wireless device.

FIG. 15 illustrates a method of operating a second wireless device in a peer-to-peer communication network, the second wireless device having a connection with a transmitter first wireless device. The second device (WT-B or WT-D) may monitor to receive a pilot signal from the first device in a pilot channel associated with a data traffic slot 1502. The second device may determine a pilot format being used by the first device based on the received pilot signal 1504. To achieve this, the second device may determine a fraction of the transmission resource in the pilot channel to be used by the first device assuming that the pilot format used by the first device corresponds to a flash signaling data traffic format 1506. It may also measure the average power of the pilot signal in the fraction of the transmission resource in the pilot channel and the average power of the pilot signal in the entire pilot channel 1508. If the measured average power on the fraction of transmission resource is at least 10 dB stronger than the measured average power in the pilot channel, the second device may determine that the pilot format used by the second device corresponds to a flash signaling data traffic format 1510.

The second device can then determine a data traffic format to be used in the data transmission slot based on the determined pilot format 1512. The data traffic format may be one of a flash signaling data traffic format and a Gaussian signaling data traffic format. When the pilot format corresponding to flash signaling data traffic format is used, the pilot signal from the second device is sent on a fraction of transmission resource of the entire pilot channel. The fraction of the pilot channel used may be less than twenty percent. Additionally, the fraction of the pilot channel used is the same as the fraction of transmission resource of the flash signaling data traffic format in the data traffic slot. This relationship in the protocol is used by the second device to determine that the same fraction will be used in the data traffic slot as it is in the pilot channel.

The interference power can be calculated by the second device based on the determined pilot format and received pilot signal 1514. In calculating the interference power, the second device may determine a fraction of transmission resources in the pilot channel over which the measured average received power is at least 10 dB stronger than the measured average power in the pilot channel, where the calculated interference power is calculated based on the received signal in the remaining fraction of transmission resources in the pilot channel 1516.

A data rate can then be determined by the second device based on the calculated interference power and the determined data traffic format 1518.

Add Power Backoff Information for Small Packet Devices with Rate Feedback (CQI Channel)

A typically CQI channel is designed to carry number of bits that corresponds to the total number rate options that the system supports (typically 3-4 bits). But, for a small packet format, the number of possible rate options is fairly small. Thus, according to one feature, the additional available bits are used to indicate power backoff that the transmitter device should use without hurting the reliability of the transmission significantly.

A first device WT A intends to transmit a small packet to a second device WT B over a peer-to-peer network connection. Let's assume that CQI channel supports 4 bits, and there is just one rate option corresponding to the small packet mode. Either through a link scheduling stage or during the pilot transmission, the second device WT B is made aware that the first device WT A has a small packet for transmission.

The first device WT A sends a pilot signal to the second device WT B over the pilot channel. The second device WT B uses the pilot signal to obtain a SINR estimation. If the SINR measured, SINR_m, is more than the SINR needed for transmission of a small packet, SINR_s, then the first device WT A can lower the power used for the data transmission by a factor of SINR_m/SINR_s. Therefore, the second device WT B may quantize SINR_m/SINR_s to 4 bits, and sends these 4 bits on the CQI channel. The first device WT A interprets these bits as power backoff bits rather than rate option bits since it knows the transmission is a small packet transmission.

Figure 16:
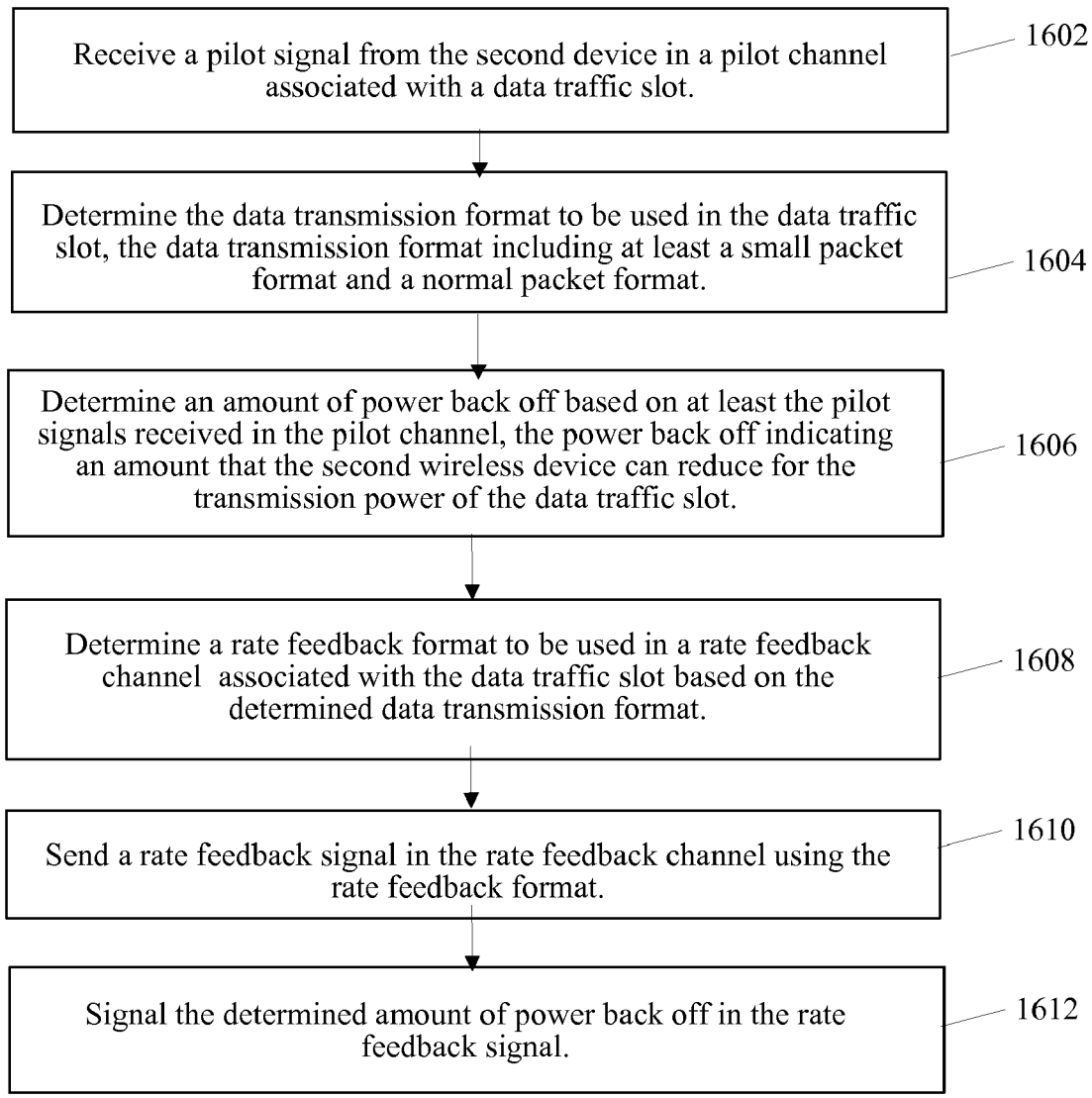
FIG. 16 illustrates a method of operating a second wireless device in a peer-to-peer communication network, where the second wireless device has a connection with a transmitter first wireless device.

FIG. 16 illustrates a method of operating a second wireless device in a peer-to-peer communication network, where the second wireless device has a connection with a transmitter first wireless device. The second device receives a pilot signal from the second device in a pilot channel associated with a data traffic slot 1602. A data transmission format to be used in the data traffic slot is then determined by the second device, where the data transmission format includes at least a small packet format and a normal packet format 1604. If the second device determines that the data transmission format to be used in the data traffic slot is a small packet format, it may determine an amount of power back off based on at least the pilot signals received in the pilot channel, the power back off indicating the amount that the second wireless device can reduce for the transmission power of the data traffic slot 1606.

A rate feedback format to be used in a rate feedback channel associated with the data traffic slot may then be determined by the second device based on the determined data transmission format 1608. The second device then sends a rate feedback signal in the rate feedback channel using the rate feedback format 1610. It may also signal the determined amount of power back off in the rate feedback signal 1612. The rate feedback signal may contain information indicative of a rate selected from a plurality of predetermined rates in a rate table, the rate table being a function of the determined data transmission format. The number of rates in the rate table may be smaller when the data transmission format is a small packet format than when the data transmission format is a normal packet format. The data transmission format may be determined based on information contained in the pilot signal.

Figure 17:
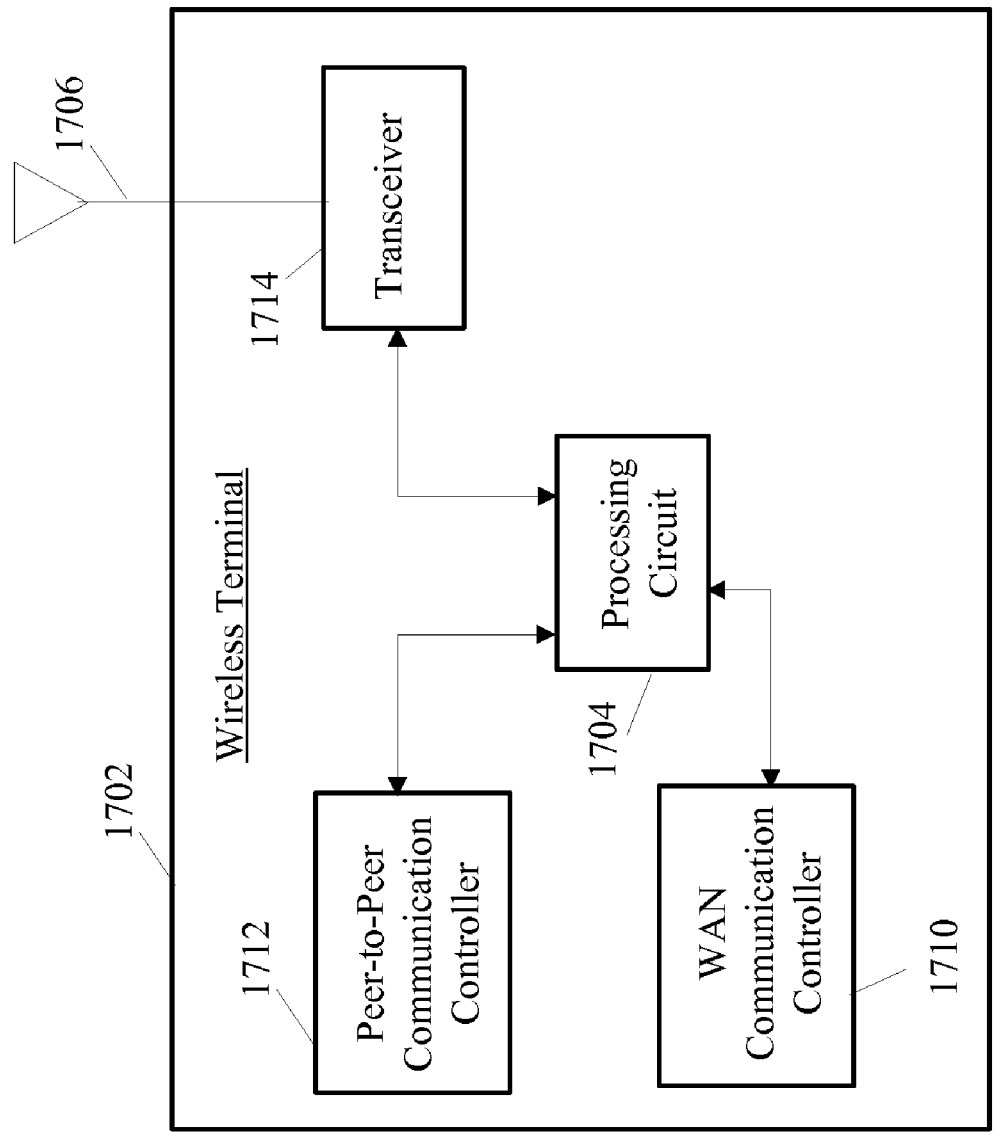
FIG. 17 is a block diagram of a first wireless terminal that may be configured to facilitate peer-to-peer communications with a second wireless terminal over a shared frequency spectrum.

FIG. 17 is a block diagram of a first wireless terminal that may be configured to facilitate peer-to-peer communications with a second wireless terminal over a shared frequency spectrum. The wireless terminal 1702 may include a processing circuit 1704 (e.g., one or more circuits or processors), a peer-to-peer communication controller 1712, a wide area network (WAN) controller 1710 and a transceiver 1714 coupled to at least one antenna 1706. The transceiver 1714 may include a (wireless) transmitter and a (wireless) receiver. The wireless terminal 1702 may communicate via a managed network infrastructure using the WAN communication controller 1210 and/or it may communicate over a peer-to-peer network using the peer-to-peer communication controller 1712. When performing peer-to-peer communications, the first wireless terminal 1702 may be configured to perform one or more of the features illustrated in FIGS. 1-16.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more modules to perform the steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

One or more of the components, steps, and/or functions illustrated in FIGS. 1-17 may be rearranged and/or combined into a single component, step, or function or embodied in several components, steps, or functions. Additional elements, components, steps, and/or functions may also be added. The apparatus, devices, and/or components illustrated in FIGS. 1, 2, and/or 17 may be configured or adapted to perform one or more of the methods, features, or steps described in FIGS. 3-16. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of operating a first wireless device having a connection with a second wireless device in a peer to peer communication network, comprising:
    selecting a first power ratio value from a plurality of predetermined power ratio values;
    sending a first transmission request signal in a first traffic slot;
    monitoring to receive a request response signal from the second wireless device, the request response signal indicating that the second wireless device is ready to receive a traffic signal from the first wireless device; and
    if the request response signal is received,
    determining a transmission power to use for a first traffic signal based on the transmission power of the first transmission request signal and the selected first power ratio value; and
    sending the first traffic signal in the first traffic slot with the determined transmission power
    wherein a ratio of the transmission power of the first traffic signal and the transmission power of the first transmission request signal is equal to the selected first power ratio value.

2. The method of claim 1, wherein the first transmission request signal includes information indicative of the selected first power ratio value.

3. The method of claim 2, wherein the first request signal is sent in two tones and the information indicative of the selected first power ratio value is signaled in the phase difference between the two tones.

4. The method of claim 3, wherein the plurality of predetermined power ratio values include values in a continuous interval between two predetermined values.

5. The method of claim 1, wherein the first power ratio value is selected from two predetermined power ratio values, the difference between the two predetermined power ratio values is at least 10 dB.

6. The method of claim 1, wherein the first power ratio value is determined as a function of the amount of data to be sent in the first traffic signal.

7. The method of claim 6, further comprising:
    checking the amount of data to be sent to the second wireless device;
    selecting a second power ratio value, as a function of the amount of data to be sent, from the plurality of predetermined power ratio values, the second power ratio value being different from the first power ratio value;
    sending a second transmission request signal in a second traffic slot;
    monitoring to receive a request response signal from the second wireless device, the request response signal indicating that the second wireless device is ready to receive a traffic signal from the first wireless device; and
    if the request response signal is received, sending a second traffic signal in the second traffic slot with the transmission power determined as a function of the transmission power of the second transmission request signal and the selected second power ratio value.

8. The method of claim 7, wherein the amount of data to be sent in the second traffic slot is at least twice as much as the amount of data sent in the first traffic slot and the second power ratio is at least 10 dB greater than the first power ratio.

9. The method of claim 7, wherein the transmission power of the second request signal is the same as the transmission power used in the first request signal.

10. The method of claim 1, further comprising:
    prior to sending the first traffic signal, sending a first pilot signal in a first part of a pilot channel associated with the first traffic slot, the transmission power of the first pilot signal being a function of the transmission power of the first transmission request signal; and
    sending a second pilot signal in a second part of the pilot channel the transmission power of the first pilot signal being a function of the transmission power of the first traffic signal.

11. A method of operating a first wireless device having a connection with a second wireless device in a peer to peer communication network, comprising:
    selecting a first power ratio value from a plurality of predetermined power ratio values;
    sending a first transmission request signal in a first traffic slot;
    monitoring to receive a request response signal from the second wireless device, the request response signal indicating that the second wireless device is ready to receive a traffic signal from the first wireless device; and
    if the request response signal is received,
    determining a transmission power to use for a first traffic signal based on the transmission power of the first transmission request signal and the selected first power ratio value; and
    sending the first traffic signal in the first traffic slot with the determined transmission power;
    monitoring to receive a rate feedback signal in a rate feedback channel associated with the first traffic slot, and wherein the transmission power of the first traffic signal is determined also as a function of the rate feedback signal.

12. A method of operating a second wireless device in a peer to peer communication network, the second wireless device having a connection with a first wireless device, comprising:

receiving a transmission request signal from the first wireless device, the first transmission request signal indicating that the first wireless device intends to send a traffic signal to the second wireless device and including information indicative of a power ratio value;

recovering the power ratio value from the transmission request signal;

measuring the power of the received transmission request signal;

predicting the power of the traffic signal to be received from the first wireless device as a function of the measured power of the received transmission request signal and the recovered power ratio value;

determining whether to receive the traffic signal from the first wireless device as a function of the predicted power; and sending a request response signal to the first wireless device if it is determined to receive the traffic signal.

13. The method of claim 12, wherein the predicted power is equal to the measured power of the received transmission request signal multiplied by the recovered power ratio value.

14. The method of claim 12, wherein the transmission power of the request response signal is determined as a function of the measured power of the received transmission request signal and is independent of the recovered power ratio value.

15. A second wireless device in a peer to peer communication network, the second wireless device having a connection with a first wireless device, comprising:

a transmitter and receiver for establishing a wireless peer-to-peer communication connection with the first wireless device;

a processing circuit coupled to the transmitter and receiver, wherein the processing circuit is adapted to:

receive a transmission request signal from the first wireless device, the first transmission request signal indicating that the first wireless device intends to send a traffic signal to the second wireless device and including information indicative of a power ratio value;

recover the power ratio value from the transmission request signal;

measure the power of the received transmission request signal;

predict the power of the traffic signal to be received from the first wireless device as a function of the measured power of the received transmission request signal and the recovered power ratio value;

determine whether to receive the traffic signal from the first wireless device as a function of the predicted power; and send a request response signal to the first wireless device if it is determined to receive the traffic signal.

16. The second wireless of claim 15, wherein the predicted power is equal to the measured power of the received transmission request signal multiplied by the recovered power ratio value.

17. The second wireless of claim 15, wherein the transmission power of the request response signal is determined as a function of the measured power of the received transmission request signal and is independent of the recovered power ratio value.

18. A second wireless device having a connection with a first wireless device in a peer to peer communication network, comprising:

means for receiving a transmission request signal from the first wireless device, the first transmission request signal indicating that the first wireless device intends to send a traffic signal to the second wireless device and including information indicative of a power ratio value;

means for recovering the power ratio value from the transmission request signal;

means for measuring the power of the received transmission request signal monitoring to receive a request response signal from the second wireless device, the request response signal indicating that the second wireless device is ready to receive a traffic signal from the first wireless device; and means for generating a predicted power by predicting the power of the traffic signal to be received from the first wireless device as a function of the measured power of the received transmission request signal and the power ratio value;

means for determining whether to receive the traffic signal from the first wireless device as a function of the predicted power; and means for sending a request response signal to the first wireless device if it is determined to receive the traffic signal.

19. The second wireless of claim 18, wherein the predicted power is equal to the measured power of the received transmission request signal multiplied by the power ratio value.

20. The second wireless of claim 18, wherein the transmission power of the request response signal is determined as a function of the measured power of the received transmission request signal and is independent of the power ratio value.

21. A circuit for facilitating communications over a peer-to-peer network, wherein the circuit operates in a second wireless device having a connection with a first wireless device in a peer to peer communication network, wherein the circuit comprising a receiver to:

receive a transmission request signal from the first wireless device, the first transmission request signal indicating that the first wireless device intends to send a traffic signal to the second wireless device and including information indicative of a power ratio value;

recover the power ratio value from the transmission request signal; measure the power of the received transmission request signal; predict the power of the traffic signal to be received from the first wireless device as a function of the measured power of the received transmission request signal and the recovered power ratio value;

determine whether to receive the traffic signal from the first wireless device as a function of the predicted power; and send a request response signal to the first wireless device if it is determined to receive the traffic signal.

22. A non-transitory machine-readable medium comprising instructions for a second wireless device having a connection with a first wireless device in a peer to peer communication network, which when executed by a processor causes the processor to:

receive a transmission request signal from the first wireless device, the first transmission request signal indicating that the first wireless device intends to send a traffic signal to the second wireless device and including information indicative of a power ratio value;

recover the power ratio value from the transmission request signal;

measure the power of the received transmission request signal;

predict the power of the traffic signal to be received from the first wireless device as a function of the measured power of the received transmission request signal and the recovered power ratio value;

determine whether to receive the traffic signal from the first wireless device as a function of the predicted power; and send a request response signal to the first wireless device if it is determined to receive the traffic signal.

23. A method of operating a third wireless device having a connection with a fourth wireless device in a peer-to-peer communication network, comprising:

receiving a first transmission request signal in a traffic slot from the fourth wireless device, the first transmission request signal indicating that the fourth wireless device intends to send a traffic signal to the third wireless device;

receiving a second transmission request signal in the traffic slot from a first wireless device, the second transmission request signal indicating that the first wireless device intends to send another traffic signal to a wireless device different from the third wireless device, the second transmission request signal including information indicative of a power ratio value;

recovering the power ratio value from the second transmission request signal;

measuring the power of the received first and second transmission request signals;

predicting the power of the desired traffic signal to be received from the fourth wireless device as a function of the measured power of the received first transmission request signal;

predicting the power of the interfering traffic signal to be transmitted by the first wireless device as a function of the measured power of the received second transmission request signal and the recovered power ratio value;

determining whether to receive the traffic signal from the fourth wireless device as a function of the predicted powers of the desired and interfering traffic signals; and sending a request response signal to the fourth wireless device if it is determined to receive the traffic signal from the fourth wireless device.

24. The method of claim 23, wherein the predicted power of the interfering traffic signal is equal to the measured power of the received second transmission request signal multiplied by the recovered power ratio value.

25. The method of claim 23, wherein whether to receive the traffic signal from the fourth wireless device is determined as a function of ratio between the predicted powers of the desired and interfering traffic signals.

26. The third wireless device of claim 13, wherein the predicted power of the interfering traffic signal is equal to the measured power of the received second transmission request signal multiplied by the recovered power ratio value.

27. The third wireless device of claim 13, wherein whether to receive the traffic signal from the fourth wireless device is determined as a function of ratio between the predicted powers of the desired and interfering traffic signals.

28. A third wireless device having a connection with a fourth wireless device in a peer-to-peer communication network, comprising:

a transmitter and receiver for establishing a wireless peer-to-peer communication connection with the fourth wireless device;

a processing circuit coupled to the transmitter and receiver, wherein the processing circuit is adapted to:

receive a first transmission request signal in a traffic slot from the fourth wireless device, the first transmission request signal indicating that the fourth wireless device intends to send a traffic signal to the third wireless device;

receive a second transmission request signal in the traffic slot from a first wireless device, the second transmission request signal indicating that the first wireless device intends to send another traffic signal to a wireless device different from the third wireless device, the second transmission request signal including information indicative of a power ratio value;

recover the power ratio value from the second transmission request signal;

measure the power of the received first and second transmission request signals;

predict the power of the desired traffic signal to be received from the fourth wireless device as a function of the measured power of the received first transmission request signal;

predict the power of the interfering traffic signal to be transmitted by the first wireless device as a function of the measured power of the received second transmission request signal and the recovered power ratio value;

determine whether to receive the traffic signal from the fourth wireless device as a function of the predicted powers of the desired and interfering traffic signals; and send a request response signal to the fourth wireless device if it is determined to receive the traffic signal from the fourth wireless device.

29. The third wireless device of claim 28, wherein the predicted power of the interfering traffic signal is equal to the measured power of the received second transmission request signal multiplied by the recovered power ratio value.

30. The third wireless device of claim 28, wherein whether to receive the traffic signal from the fourth wireless device is determined as a function of ratio between the predicted powers of the desired and interfering traffic signals.

31. A third wireless device having a connection with a fourth wireless device in a peer-to-peer communication network, comprising:

means for receiving a first transmission request signal in a traffic slot from the fourth wireless device, the first transmission request signal indicating that the fourth wireless device intends to send a traffic signal to the third wireless device;

means for receiving a second transmission request signal in the traffic slot from a first wireless device, the second transmission request signal indicating that the first wireless device intends to send another traffic signal to a wireless device different from the third wireless device, the second transmission request signal including information indicative of a power ratio value;

means for recovering the power ratio value from the second transmission request signal;

means for measuring the power of the received first and second transmission request signals;

means for predicting the power of the desired traffic signal to be received from the fourth wireless device as a function of the measured power of the received first transmission request signal;

means for predicting the power of the interfering traffic signal to be transmitted by the first wireless device as a function of the measured power of the received second transmission request signal and the recovered power ratio value;

means for determining whether to receive the traffic signal from the fourth wireless device as a function of the predicted powers of the desired and interfering traffic signals; and means for sending a request response signal to the fourth wireless device if it is determined to receive the traffic signal from the fourth wireless device.

32. A circuit for facilitating communications over a peer-to-peer network, wherein the circuit operates in a third wireless device having a connection with a fourth wireless device in a peer-to-peer communication network, wherein the circuit comprising a receiver to:

receive a first transmission request signal in a traffic slot from the fourth wireless device, the first transmission request signal indicating that the fourth wireless device intends to send a traffic signal to the third wireless device;

receive a second transmission request signal in the traffic slot from a first wireless device, the second transmission request signal indicating that the first wireless device intends to send another traffic signal to a wireless device different from the third wireless device, the second transmission request signal including information indicative of a power ratio value;

recover the power ratio value from the second transmission request signal;

measure the power of the received first and second transmission request signals; predict the power of the desired traffic signal to be received from the fourth wireless device as a function of the measured power of the received first transmission request signal;

predict the power of the interfering traffic signal to be transmitted by the first wireless device as a function of the measured power of the received second transmission request signal and the recovered power ratio value;

determine whether to receive the traffic signal from the fourth wireless device as a function of the predicted powers of the desired and interfering traffic signals; and send a request response signal to the fourth wireless device if it is determined to receive the traffic signal from the fourth wireless device.

33. A non-transitory machine-readable medium comprising instructions for a third wireless device having a connection with a fourth wireless device in a peer-to-peer communication network, which when executed by a processor causes the processor to:

receive a first transmission request signal in a traffic slot from the fourth wireless device, the first transmission request signal indicating that the fourth wireless device intends to send a traffic signal to the third wireless device;

receive a second transmission request signal in the traffic slot from a first wireless device, the second transmission request signal indicating that the first wireless device intends to send another traffic signal to a wireless device different from the third wireless device, the second transmission request signal including information indicative of a power ratio value;

recover the power ratio value from the second transmission request signal;

measure the power of the received first and second transmission request signals;

predict the power of the desired traffic signal to be received from the fourth wireless device as a function of the measured power of the received first transmission request signal;

predict the power of the interfering traffic signal to be transmitted by the first wireless device as a function of the measured power of the received second transmission request signal and the recovered power ratio value;

determine whether to receive the traffic signal from the fourth wireless device as a function of the predicted powers of the desired and interfering traffic signals; and send a request response signal to the fourth wireless device if it is determined to receive the traffic signal from the fourth wireless device.

* * * * *